US011578588B2

(12) United States Patent
Nguyen et al.

(10) Patent No.: US 11,578,588 B2
(45) Date of Patent: Feb. 14, 2023

(54) FREQUENCY WEIGHTING IN BROADBAND ACOUSTIC BEAMFORMING

(71) Applicant: Halliburton Energy Services, Inc., Houston, TX (US)

(72) Inventors: Nam Nguyen, Singapore (SG); Yi Yang Ang, Singapore (SG); Rebecca Corina Jachmann, Spring, TX (US); Yinghui Lu, The Woodlands, TX (US); Srinivasan Jagannanthan, Houston, TX (US); Avinash Vinayak Taware, San Jose, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 1261 days.

(21) Appl. No.: 15/781,923

(22) PCT Filed: Jul. 12, 2016

(86) PCT No.: PCT/SG2016/050326
§ 371 (c)(1),
(2) Date: Jun. 6, 2018

(87) PCT Pub. No.: WO2017/123150
PCT Pub. Date: Jul. 20, 2017

(65) Prior Publication Data
US 2018/0355712 A1 Dec. 13, 2018

Related U.S. Application Data

(63) Continuation-in-part of application No. PCT/US2016/012806, filed on Jan. 11, 2016.

(51) Int. Cl.
*E21B 47/107* (2012.01)
*G01V 1/40* (2006.01)
*G01H 17/00* (2006.01)

(52) U.S. Cl.
CPC .............. *E21B 47/107* (2020.05); *G01V 1/40* (2013.01); *G01H 17/00* (2013.01);
(Continued)

(58) Field of Classification Search
CPC ................................ E21B 47/107; G01V 1/40
(Continued)

(56) References Cited

U.S. PATENT DOCUMENTS 4,881,207 A 11/1989 Dubesset et al.
6,227,036 B1 5/2001 Yonak et al.
(Continued)

FOREIGN PATENT DOCUMENTS

EP 1325358 B1 2/2009
WO 2000079425 A1 12/2000
WO 2016115012 A1 7/2016

OTHER PUBLICATIONS

ID Application Serial No. PID201804950, Office Action, dated Sep. 17, 2019, 3 pages.
(Continued)

*Primary Examiner* — Ricky Go
(74) *Attorney, Agent, or Firm* — Delizio, Peacock, Lewin & Guerra

(57) ABSTRACT

Disclosed are systems and methods for processing broadband acoustic signals acquired by a plurality of acoustic sensors, using an array-signal-processing technique to compute fused-signal maps in the frequency domain for a plurality of frequency bins. In accordance with various embodiments, the fused-signal maps are combined across the frequency bins, with respective weightings that are based on eigenvalues of covariance matrices computed for the plurality of frequency bins. The combined maps can be used to locate an acoustic source in a wellbore.

20 Claims, 15 Drawing Sheets

(52) U.S. Cl.
CPC .............. *G01V 2210/123* (2013.01); *G01V 2210/1429* (2013.01); *G01V 2210/43* (2013.01)

(58) Field of Classification Search
USPC ............................................................ 702/6
See application file for complete search history.

(56) References Cited

U.S. PATENT DOCUMENTS

| | | | | |
|---|---|---|---|---|
| 8,219,320 | B2* | 7/2012 | Saenger | G01V 1/30 702/14 |
| 2003/0139884 | A1 | 7/2003 | Blanch et al. | |
| 2010/0262373 | A1 | 10/2010 | Khadhraoui et al. | |
| 2011/0231097 | A1 | 9/2011 | Market | |
| 2012/0257475 | A1 | 10/2012 | Luscombe et al. | |
| 2012/0287749 | A1 | 11/2012 | Kutlik et al. | |
| 2013/0238248 | A1* | 9/2013 | Aeron | G01V 1/36 702/17 |
| 2015/0153470 | A1* | 6/2015 | Stove | G01V 3/18 702/6 |
| 2015/0331123 | A1* | 11/2015 | Guigné | G01V 1/34 702/16 |

OTHER PUBLICATIONS

EP Application Serial No. EP16885290.3; Extended European Search Report; dated Jul. 16, 2019, 13 pages.

Aarabi, "The Fusion of Distributed Microphone Arrays for Sound Localization", EURASIP Journal on Advances in Signal Processing, vol. 2003, No. 4, Jan. 1, 2003, pp. 338-347, 10 pages.

Torres, et al., "Robust acoustic source localization based on modal beamforming and time-frequency processing using circular microphone ar", Acoustical Society of America, vol. 132, No. 3, Sep. 1, 2012, pp. 1511-1520, 10 pages.

Yan, "Broadband Beamspace DOA Estimation: Frequency-Domain and Time-Domain Processing Approaches", EURASIP Journal on Advances in Signal Processing, vol. 2007, No. 1, Sep. 7, 2006, 10 pages, 10 pages.

PCT Application Serial No. PCT/SG2016/050326, International Search Report, dated Oct. 18, 2016, 4 pages.

PCT Application Serial No. PCT/SG2016/050326, International Written Opinion, dated Oct. 18, 2016, 5 pages.

* cited by examiner

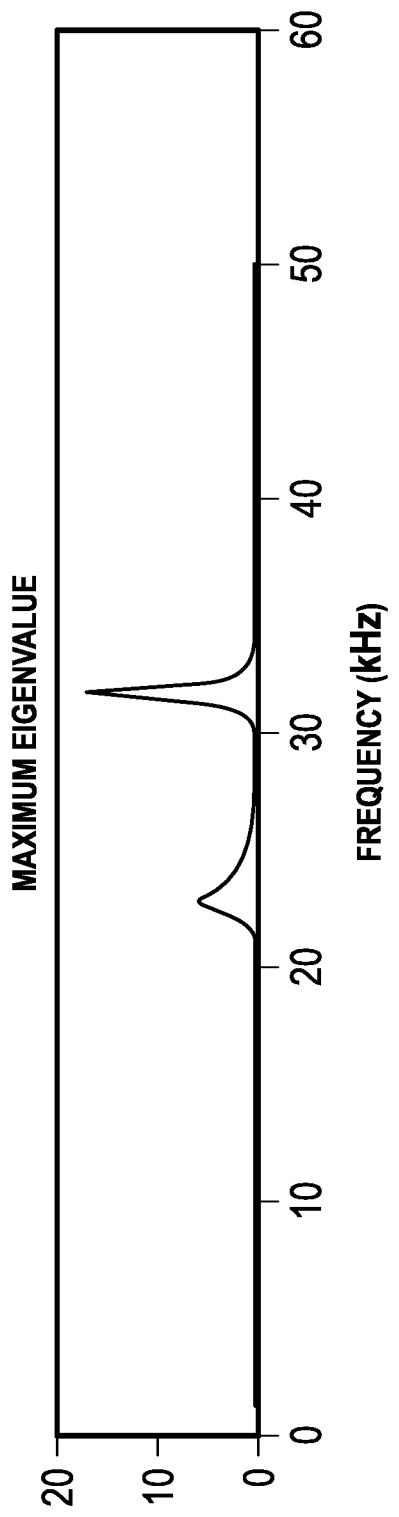
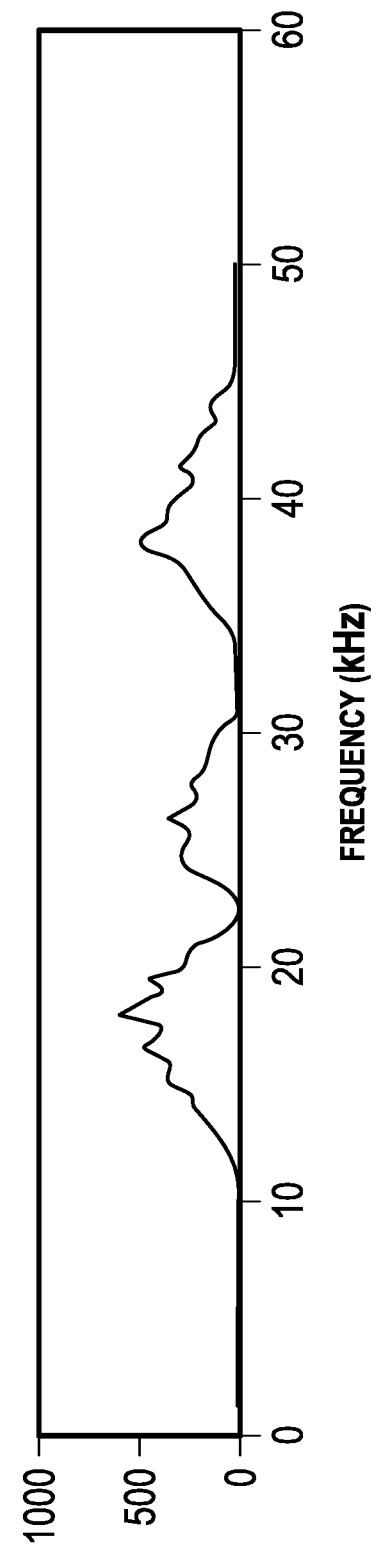
FIG. 7A
FIG. 7B

FREQUENCY WEIGHTING IN BROADBAND ACOUSTIC BEAMFORMING

PRIORITY APPLICATIONS

This application is a continuation-in-part of International Application Ser. No. PCT/US2016/012806, filed on 11 Jan. 2016, which application claims the benefit of priority to U.S. Provisional Application Ser. No. 62/103,006, filed on 13 Jan. 2015, which applications are incorporated by reference herein in their entirety.

BACKGROUND

During the life cycle of an oil or gas well, it is desirable to monitor and maintain well integrity. In particular, the integrity of the well barriers (such as the production tubing, the well casing, and the surrounding cement sheath) is important to ensure safe operation of the well and avoid blow-out incidents or leakage of hydrocarbons to the environment. Leaks in the well barriers can in principle be detected based on underground fluid flows (e.g., of oil or gas) in and around a wellbore. Monitoring downhole flows around wellbores, such as injected water, can further be of interest in reservoir characterization. Underground flows generally emit acoustic signals that can be measured, e.g., with fiber cables disposed along the wellbore or with acoustic point sensors such as Fiber Bragg Grating (FBG) sensors or hydrophones. Existing methods are, however, very limited in the accuracy and precision with which they can localize (if at all) a detected flow.

BRIEF DESCRIPTION OF THE DRAWINGS

FIGS. 7A and 7B are graphs, derived from synthetic data, of the maximum eigenvalue of the covariance matrix and the eigenratio of the covariance matrix, respectively, as a function of frequency, illustrating different weighting candidates in accordance with various embodiments.

DETAILED DESCRIPTION

The present disclosure relates generally to tools, systems, and methods for detecting one or more underground acoustic sources, and localizing them in depth and radial distance from a wellbore, by array-signal processing, which includes beamforming and other signal processing methods that makes use of acoustic signals measured with a plurality of acoustic sensors disposed in the wellbore to enable source localization. In accordance with various embodiments, the acoustic signals are measured for a broad frequency range and processed individually for multiple narrow frequency bands, and the beamforming results for the individual frequency bands are combined in a weighted manner. More specifically, in some embodiments, broadband acoustic signals measured with the plurality of sensors are Fourier-transformed to obtain respective acoustic spectra, which are then subdivided into a plurality of frequency bins. For each frequency bin, the respective portions of the acoustic spectra for the plurality of sensors are processed together to compute a fused-signal parameter (e.g., an acoustic energy or amplitude) as a function of depth and radial distance (hereinafter also called a "fused-signal map") whose local maximum or maxima correspond to the locations of one or more acoustic sources. It has been observed that the quality of the beamforming results varies greatly with the frequency of the measurement. Accordingly, it is desirable to select, for purposes of acoustic-source localization, frequencies for which the beamforming quality is high, or weight these frequencies higher when combining the results obtained for multiple frequency bins. In some embodiments, a covariance matrix between the Fourier-transformed acoustic spectra measured by the plurality of sensors is computed for each frequency bin, and the beamforming results for the various bins are weighted based on certain eigenvalues of the respective covariance matrices.

The foregoing will be more readily understood from the following description of various example embodiments and the accompanying drawings.

Figure 1:
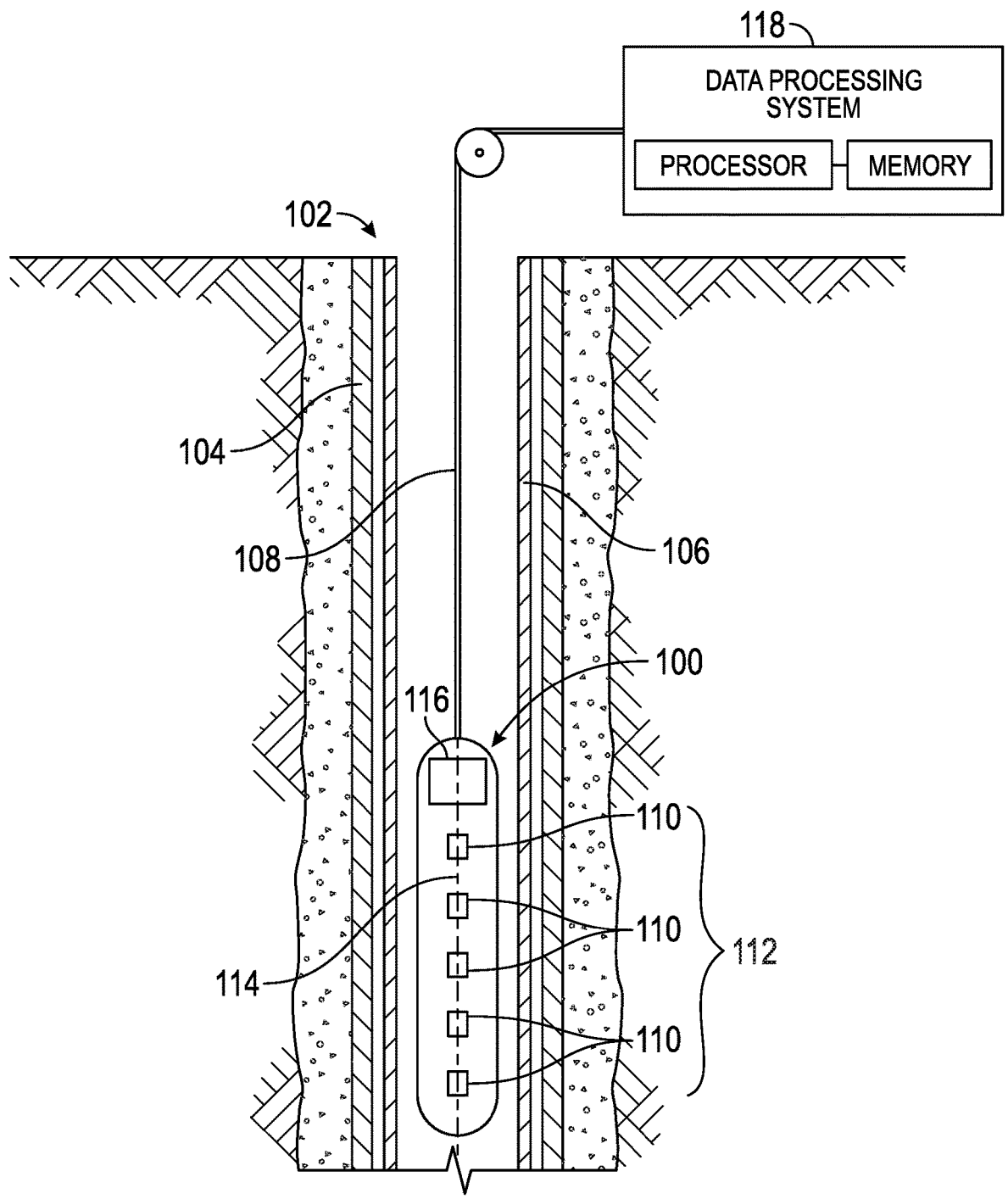
FIG. 1 is a schematic cross-sectional depiction of an example acoustic logging tool deployed within a cased wellbore in a wireline operation, in accordance with various embodiments.

FIG. 1 is a schematic cross-sectional depiction of an example acoustic logging tool 100 deployed within a cased wellbore 102 in a wireline operation, in accordance with various embodiments. As shown, the wellbore 102 is completed with a casing string 104 cemented in place; more generally, the wellbore 102 may include one or multiple nested casing strings. Also shown is production tubing 106, through which hydrocarbons may be pumped out of the wellbore 102. The acoustic logging tool 100 is disposed interior to the production tubing 106, suspended from a wireline 108 as part of a wireline logging system. The tool 100 includes a plurality of acoustic sensors 110 (such as, e.g., hydrophones), e.g., arranged in a linear array 112 along a longitudinal axis 114 of the tool 100 and, thus, of the wellbore 102. The tool 100 further includes suitable control and processing circuitry 116, which may, in turn, be in communication (e.g., via a wired connection or a telemetry system) with a surface data-processing system 118 (e.g., implemented by a general-purpose computer including one or more processors and associated memory).

Using the acoustic sensor array 112, the acoustic logging tool 100 can search, at a given depth of logging, a predefined two-dimensional space, for example, the array aperture length in the depth direction and a few feet into the formation in the radial direction. (The term "depth" herein generally refers to a coordinate along the direction of the longitudinal axis of a wellbore, regardless whether the wellbore extends vertically into the formation (as shown in FIG. 1) or is tilted with respect to the vertical direction. The term "radial" refers to a direction perpendicular to and away from the longitudinal wellbore axis. Thus, the "radial distance," as used herein, is the distance from the wellbore axis, measured perpendicularly thereto.) This search can be repeated as the array 112 moves to another depth of logging. Thus, within one pass of wireline logging, a region spanning the entire length of the wellbore 102 can be searched for acoustic sources. Acoustic-source detection and localization in accordance herewith may be employed, in particular, to find underground fluid flows (e.g., resulting from leaks in the well barriers, as described below with reference to FIG. 2) from which the acoustic signals emanate. In some embodiments, the acoustic sensor array 112 is operated in a fast logging speed (e.g., at as much as 60 feet per minute) to detect flows initially with coarse spatial resolution. Once one or more flows have been detected at certain depths, regions at those depths can be re-logged at a slower logging speed, or in stationary mode, to localize the flow(s) at a finer spatial resolution. In embodiments where an acoustic signal is emitted along an extended path (as opposed to from a point source), the whole flow path may be mapped out in a two-dimensional space of depth and radial distance.

The computational functionality for processing and fusing the acoustic signals received by the individual sensors 110 and detecting and localizing flows based thereon may be implemented by either one of the control and processing circuitry 116 integrated into the tool 100 or the data-processing system 118 that is located at the surface, or by both in combination. For example, in some embodiments, the control and processing circuitry 116 pre-processes the individual sensor signals (e.g., through signal conditioning, filtering, and/or noise cancellation) and transmits them to the surface data-processing system 118, where the fused-signal map is computed, and any flow-induced acoustic sources are detected and localized based thereon. Each of the control and processing circuitry 116 and the surface data-processing system 118 may generally be implemented in hardware, software, or a combination thereof, such as with special-purpose circuitry (e.g., a digital signal processor, field-programmable gate-array, etc.) or a suitably programmed general-purpose computer including, e.g., a processor and associated memory (as shown in FIG. 1). In various embodiments, the processed acoustic signals are evaluated in conjunction with measurements from other sensors (e.g., temperature and surface well-pressure measurements) to evaluate flow conditions and overall well integrity.

Alternative sensor configurations may be employed to support acoustic-source detection in a wireline logging operation. For example, in some embodiments, a distributed fiber-optic cable is used in place of acoustic point sensors such as hydrophones. The fiber-optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Alternatively to being conveyed downhole on a wireline, as described above, the acoustic logging tool 100 can be deployed using other types of conveyance, as will be readily appreciated by those of ordinary skill in the art. For example, the tool 100 may be lowered into the wellbore 102 by slickline (a solid mechanical wire that generally does not enable power and signal transmission), and may include a battery or other independent power supply as well as memory to store the measurements until the tool 100 has been brought back up to the surface and the data retrieved. Alternative means of conveyance include, for example, coiled tubing, downhole tractor, or drill pipe (e.g., used as part of a tool string within or near a bottom-hole-assembly during logging/measurement-while-drilling operations). Acoustic-source detection and localization during drilling may be useful, e.g., to detect flows for the purpose of characterizing the formation and hydrocarbon reservoirs, and steer or otherwise adjust drilling based thereon.

Figure 2:
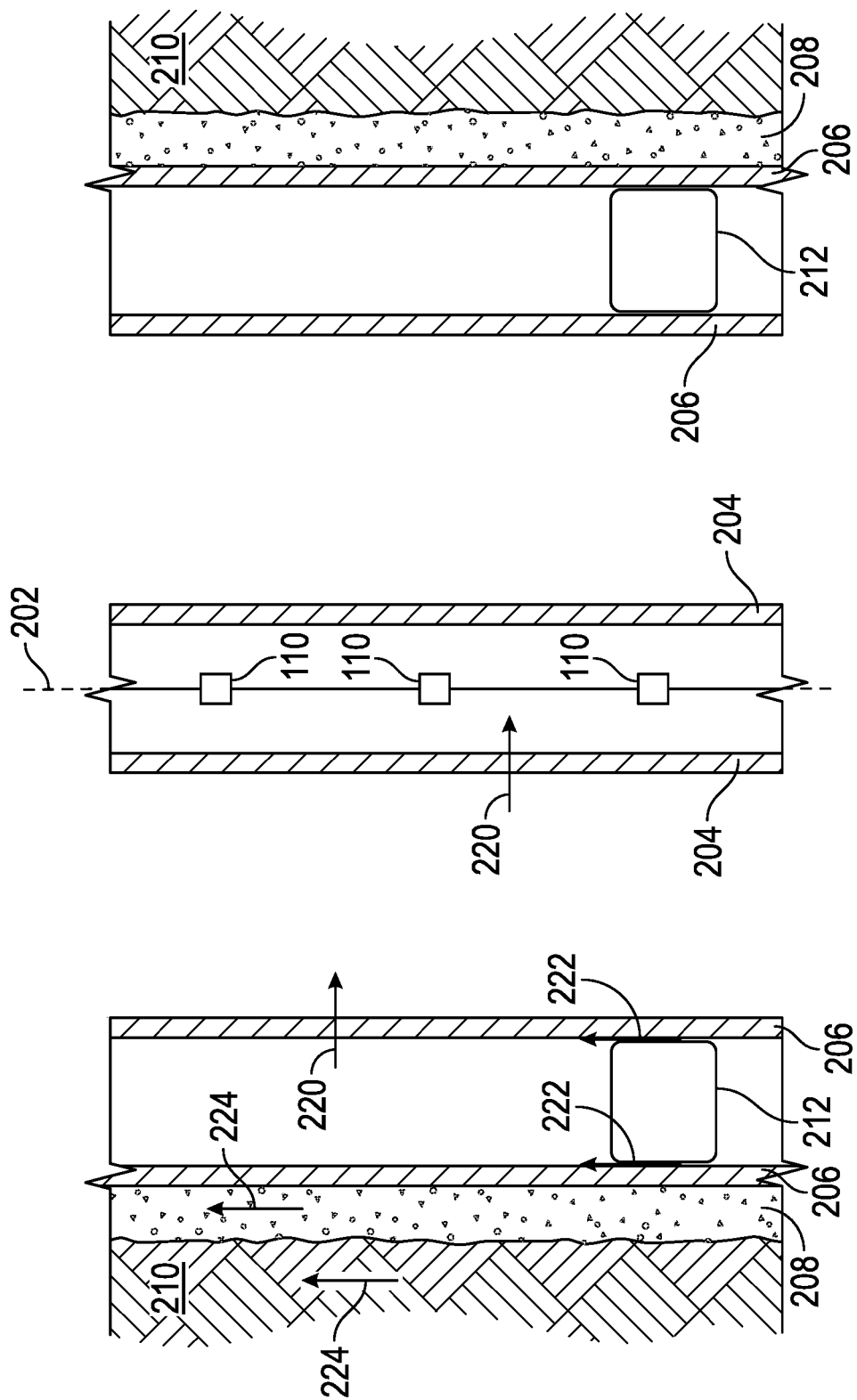
FIG. 2 is a schematic cross-sectional depiction of an example acoustic-sensor array deployed within a cased wellbore, illustrating different kinds of leaks detectable in accordance with various embodiments.

Returning to the application of acoustic-source detection for the purpose of assessing the integrity of the well barriers, FIG. 2 is a schematic cross-sectional depiction of an example acoustic-sensor array deployed within a cased wellbore, illustrating different kinds of leaks detectable in accordance with various embodiments. As shown, the sensors 110 may be arranged linearly along the longitudinal axis 202 of the wellbore (whose radial coordinate is zero). They may be uniformly spaced (as shown), or have varying spacings between adjacent sensors 110. The sensor environment generally includes multiple physical barriers to fluid flow, such as the production tubing 204 through which oil or gas may be pumped up and out of the well, one or optionally multiple nested well casings 206, and a cement sheath 208 filling the space between the casing(s) 206 and the formation 210 surrounding the wellbore. Additionally, the wellbore may be divided into multiple vertical and/or horizontal sections, e.g., by packers 212 between the casings 206 that may separate, e.g., a lower, perforated portion of the tubing where hydrocarbons enter from an upper (non-perforated)

portion serving as an upward conduit. Unintended flow scenarios that can occur in such a configuration include, e.g., flows across the casing 206 or tubing 204 due to cracks or holes therein (indicated by arrows 220), flows past a packer 212 between adjacent wellbore sections due to insufficient sealing (indicated by arrows 222), and flows within the formation 210, cement sheath 208, or other layer more or less parallel to the layer boundaries (indicated by arrows 224). As these flows pass through restricted paths, acoustic signals can be generated as a result of the accompanying pressure drops. The acoustic signals propagate generally in all direction through the formation and/or wellbore, eventually being detected at the various sensor locations.

The acoustic signals detected substantially simultaneously (or, more generally, with known temporal relations therebetween) by the individual sensors (e.g., sensors 110) of the acoustic logging tool may be combined into a single signal, e.g., by forming a linear combination that approximates the signal as emitted by the source (or a combination of multiple sources). ("Substantially simultaneously" herein indicates that the time intervals over which signals are collected overlap significantly (e.g., by at least 90%, preferably at least 99%) between the different sensors.) Such signal fusion can generally be accomplished by so-called array signal processing. Array-signal-processing techniques known in the art include various spatial filtering methods, also often referred to as "beamforming" methods, such as conventional beamforming, Capon beamforming, Multiple Signal Classification (MUSIC), minimum-norm beamforming, maximum-likelihood beamforming, compressive beamforming, and delay-and-sum beamforming.

In various embodiments, a spatial-filtering (e.g., beamforming) or other array-signal-processing method is employed to fuse the various simultaneously acquired sensor signals, localizing the acoustic source in the process. More specifically, the signals from the multiple sensors are fused for a plurality of putative source locations within a predefined two-dimensional region (that, e.g., spans a certain length in the depth direction and extends to a certain radial distance from the borehole) to thereby compute a two-dimensional map of an acoustic-source energy level, amplitude, or other fused-signal parameter as a function of depth and radial distance. The actual source location(s) can be determined from this map by identifying the local maximum (or multiple local maxima) of the acoustic source energy level or other fused-signal parameter. The magnitude of the local maximum can be used to infer whether the identified acoustic source indeed corresponds to an underground flow. For instance, in some embodiments, acoustic signals are acquired under multiple flow and non-flow conditions to establish a statistical detection threshold for flows for use in a binary-hypothesis test or similar statistical test.

Beamforming methods generally rely on a forward model of wave propagation from the source(s) to the sensors to solve the inverse problem, i.e., to determine the source signal from the signals received at the sensors. In traditional application contexts, such as radar and sonar, this forward model is generally straightforward because wave propagation occurs in a uniform (homogenous and isotropic) medium (e.g., air or water) and the source can be assumed, as a practical matter, to be far away from the sensors. When fluid flows in and surrounding a wellbore are to be measured, however, the uniform-medium and far-field assumptions generally break down. Accordingly, in various embodiments, the forward model is adjusted to account for the configuration of the wellbore and surrounding formation (which collectively include various propagation media and boundaries therebetween) and their effect on the wave field (e.g., wave refractions, reflections, and resonances), as well as to facilitate the processing of near-field signals (i.e., signals originating from a source whose distance from the sensors is not significantly (e.g., orders of magnitude) larger than the spatial extent of the sensor array).

Figure 3:
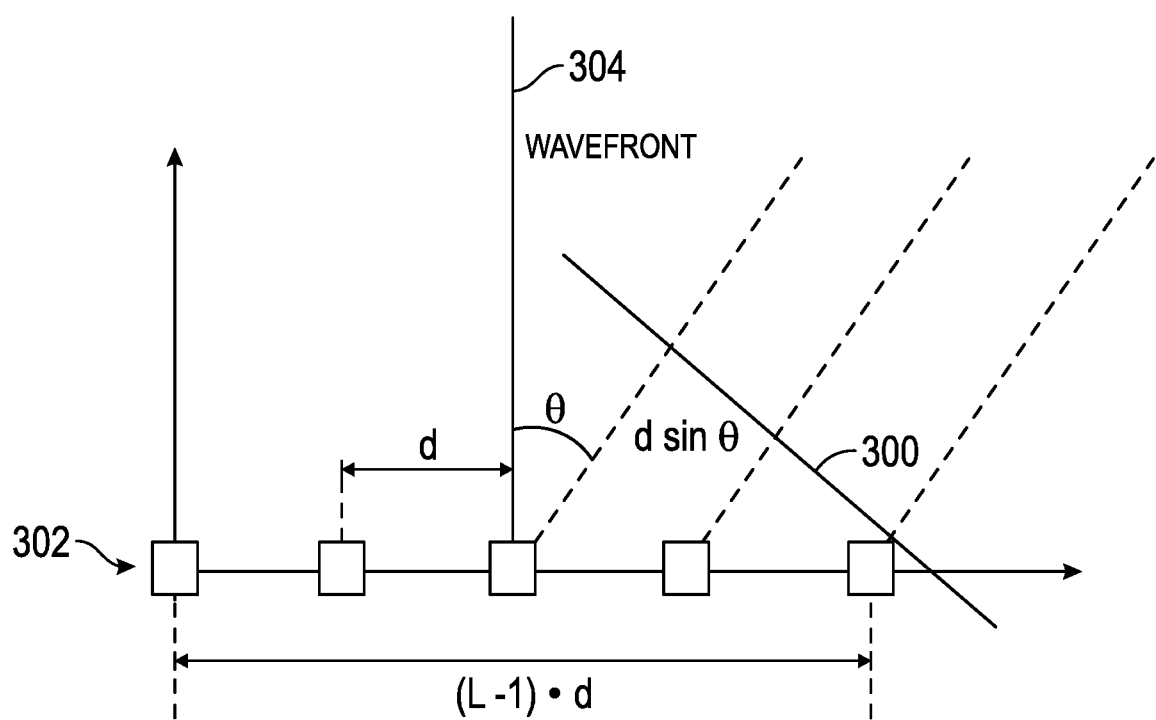
FIG. 3 is a schematic diagram of a planar wavefront impinging on a linear acoustic sensor array, illustrating receipt of a far-field acoustic signal.

To illustrate the principle underlying spatial filtering methods, consider a narrowband, far-field acoustic source s(t). FIG. 3 is a schematic diagram of a planar wave 300 impinging on a linear acoustic sensor array 302, as may be received from such a far-field source. The acoustic waves emitted from the source impinge on the linear array 302 at an angle $\theta$ with respect to the normal 304 to the array, such that the sensors within the array 302 measure signals (expressed as a vector X(t)):

$$X(t)=a(\theta)s(t)+n(t),$$

where $a(\theta)$ is a complex-valued vector expressing the amplitude attenuation and phase shift undergone by the signal on its path from the source to the respective sensors (which depends on the source location relative to the sensor), and n(t) is a vector expressing the contribution of noise. Conversely, an unknown source signal can be estimated by fusing the measured signals, in accordance with:

$$y(t) = \frac{1}{L}\sum_{i=1}^{L}a_i(\theta)\cdot x_i(t) = \frac{a^H(\theta)}{L}X(t),$$

where L is the number of sensors and the superscript H denotes the conjugate transpose (i.e., the Hermitian). The vector $a(\theta)$ encapsulates the forward model of phase propagation, and is often referred to as the steering vector. In the simple case of a uniform medium in which the waves travel at a constant speed of sound c, with a wave vector $k=\omega/c$, $a(\theta)$ takes the form:

$$a(\theta)=[1e^{-ikd\cos\theta} \ldots e^{-i(L-1)kd\cos\theta}]^T,$$

where d is the distance between adjacent sensors of a uniform array. In this simple scenario, the time delays of individual sensors are a function of the incident angle $\theta$ only. To process near-field signals and further to include the effects of different media between the source and sensor array (e.g., as depicted in FIG. 2), the steering vector $a(\theta)$ is suitably modified, in accordance with various embodiments, to become a function $a(\theta, r_{spherical})$ of $\theta$ and the range $r_{spherical}$ of the source, i.e., the distance of the source from the sensor in spherical coordinates (which differs from the perpendicular radial distance of the source from the wellbore axis). Of course, the steering vector can alternatively be expressed as a function of the radial distance r from the wellbore axis and the depth z: a(r, z). The modified steering vector may depend on the configuration and condition of the wellbore and surrounding formation, taking into account, e.g., the geometry and material properties of various layers and their effect on sound propagation (e.g., the resulting sound velocities in rock, mud, cement, etc.).

Using a more general mathematical description, array signal processing involves expressing the fused signal y(t) as a weighted linear combination of the measured signals, $$y(t) = \sum_{i=1}^{L}w_i^*\cdot x_i(t) = w^H X(t),$$

and determining the complex-valued weight vector w based on a suitable heuristic. For example, in conventional beamforming, the weights are selected to maximize the output power Pw(w) of the fused signal (summing over N samples of the signal y(t)):

$$Pw(w) = \frac{1}{N}\sum_{i=1}^{N}|y(t)|^2 = \frac{1}{N}\sum_{i=1}^{N}w^H X(t)X^H(t)w = w^H \hat{R}w,$$

where $\hat{R}$ is the sample covariance matrix $$\hat{R} = \frac{1}{N}\sum_{i=1}^{N}X(t)X^H(t).$$

The resulting optimization problem takes the form $$\max_w E\{w^H X(t)X^H(t)w\} = \max_w \{E[|s(t)|^2] \cdot |w^H a(r,z)|^2 + w^H C_n w\}$$

subject to the constraint, |w|=1. The non-trivial solution to this problem is:

$$w = \frac{a(r, z)}{a^H(r, z)a(r, z)} = \frac{a(r, z)}{L}.$$

As another example, in Capon beamforming, the optimization problem takes the form $$\min_w E\{w^H X(t)X^H(t)w\} \min_w \{E[|s(t)|^2] \cdot |w^H a(r,z)|^2 + w^H C_n w\}$$

subject to the constraint $|w^H a(r, z)|=1$. This method fixes the gain and minimizes the noise contribution. The solution is:

$$w = \frac{\hat{R}^{-1} a(r, z)}{a^H(r, z)\hat{R}^{-1} a(r, z)}.$$

As can be seen, Capon beamforming incorporates the data (reflected in the sample covariance matrix $\hat{R}$) with the a-priori known forward model, and is thus one example of so-called "adaptive" spatial filtering methods. Additional methods are known to those of ordinary skill in the art, and can be implemented straightforwardly and without undue experimentation.

Figure 4A:
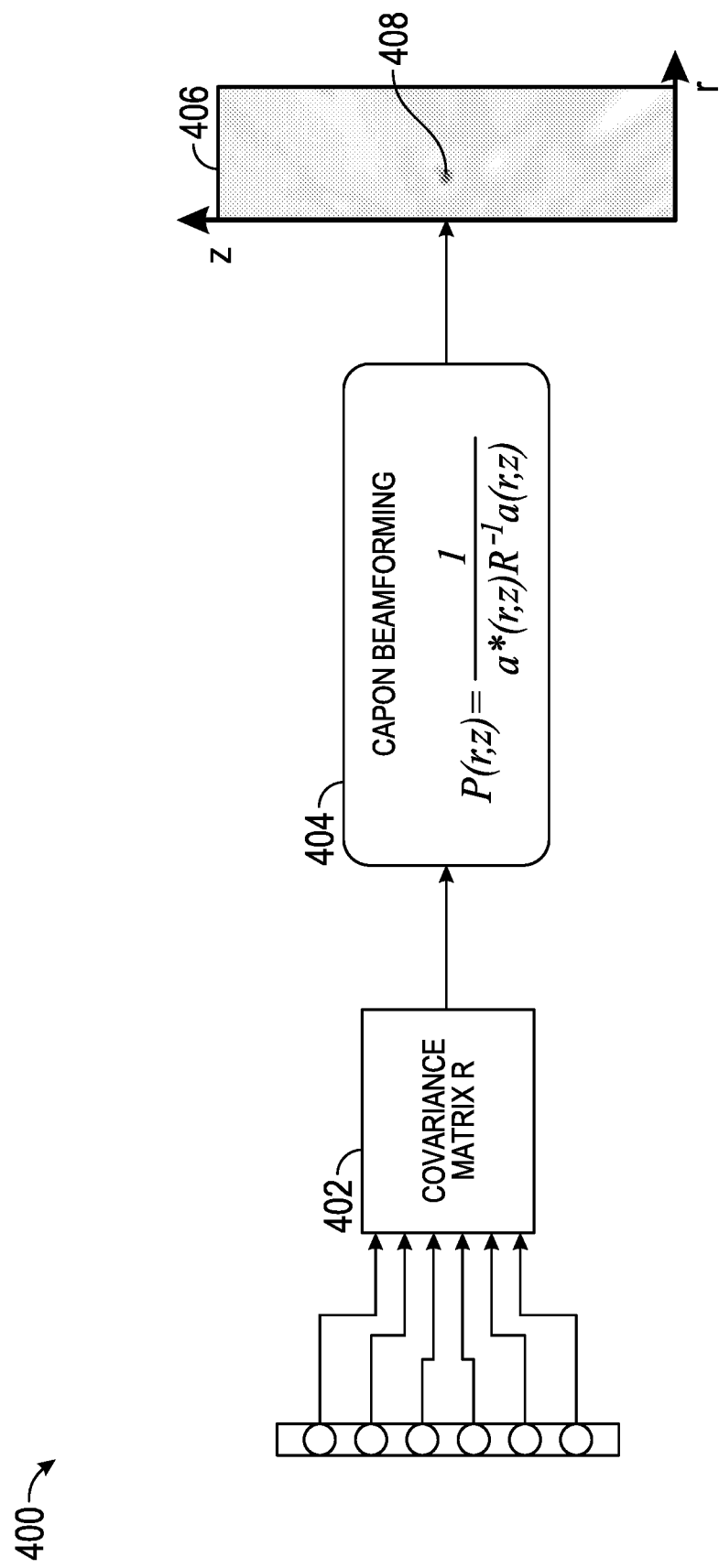
FIG. 4A is a schematic diagram of a method for detecting and localizing an acoustic source based on narrow-band acoustic signals, using Capon beamforming.

FIG. 4A is a schematic diagram illustrating and summarizing an example method for detecting and localizing an acoustic source, using Capon beamforming applied to narrow-band acoustic signals. The method involves measuring narrow-band time-domain acoustic signals X(t) with an acoustic-sensor array 400, computing the covariance matrix $\hat{R}$ (402) from the signals, and using Capon beamforming to compute the pixels of a beamformer energy map P (an example of a fused-signal map) at locations (r, z):

$$P(r, z) = E\{w^H X(t)X^H(t)w\} = w^H \hat{R}$$

$$w = \frac{1}{a^H(r, z)\hat{R}^{-1} a(r, z)}(404).$$

The energy map 406 exhibits a local energy maximum at 408, which corresponds to the location of an acoustic source.

Figure 4B:
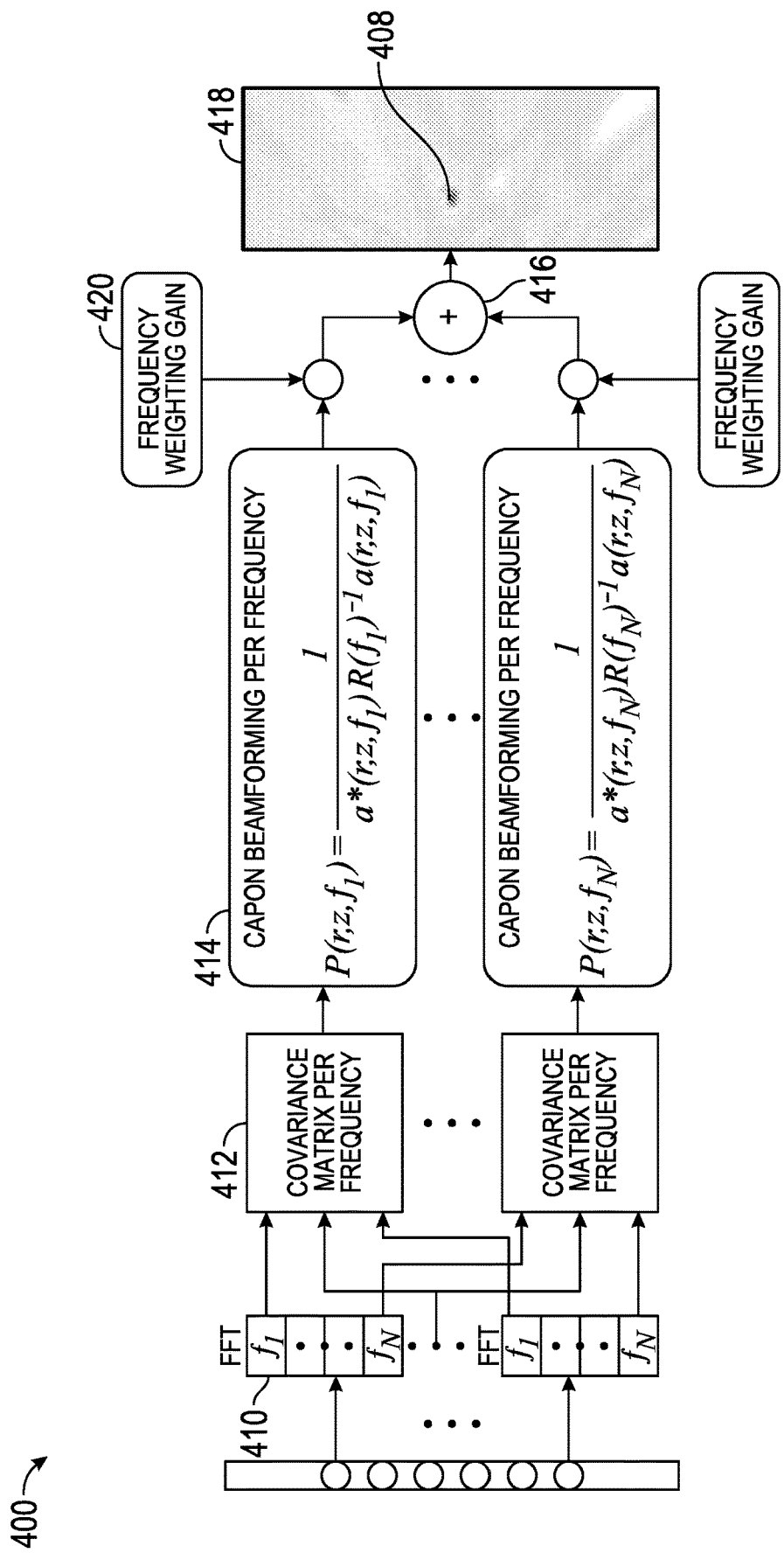
FIG. 4B is a schematic diagram of a method for detecting and localizing an acoustic source based on broad-band acoustic signals in accordance with various embodiments, using Capon beamforming.

Since flow-induced acoustic source usually emit broadband signals, beamforming as shown in FIG. 4A is extended, in accordance with various embodiments, to the frequency domain; this is illustrated in FIG. 4B, which depicts a method for detecting and localizing an acoustic source based on broad-band acoustic signals, using Capon beamforming. Here, the acoustic-sensor array 400 measures broadband acoustic signals $X_{broad}(t)$, which are converted, at 410, by Fourier transform (e.g., implemented numerically in the form of the well-known fast Fourier transform (FFT) algorithm) into acoustic spectra for each of the plurality of sensors within the array 400. Each spectrum is sub-divided into multiple narrow frequency bands, herein also referred to as "frequency bins" (or simply "bins"), which collectively cover the frequency range of the spectra. The narrow-band acoustic spectra for a given frequency bin are combined across sensors to compute a covariance matrix 412 for the frequency bin. Capon beamforming is then used to compute separate beamformer energy maps for the various frequency bins $f_n$:

$$P(r, z, f_n) = \frac{1}{a^H(r, z, f_n)\hat{R}^{-1} a(r, z, f_n)}(414).$$

The beamformer energy map for each individual frequency bin is computed in the same manner as the narrow-band beamformer energy map of FIG. 4A. The beamformer energy maps for the multiple frequency bins are combined, at 416, into a single beamformer energy map 418, from which the existence and location of an acoustic source can be inferred based on the local maximum 408.

Conventionally, the beamformer energy maps (or, more generally, fused-signal maps) for multiple frequency bins are combined simply by adding or averaging them, i.e., giving equal weights to all frequencies. Studies have revealed, however, that some frequencies provide better beamforming results than others. For example, due to the resonant effect inside layers of casing and tubing, certain frequencies, certain frequencies are unsuitable for beamforming. To address this problem, various embodiments described herein involve applying different weights 420 to the beamforming results for different frequencies, the weights being based on the relative quality of the beamforming results. The weights for entirely unsuitable frequencies may be set to zero to exclude the corresponding beamformer energy maps altogether.

Figure 5D:
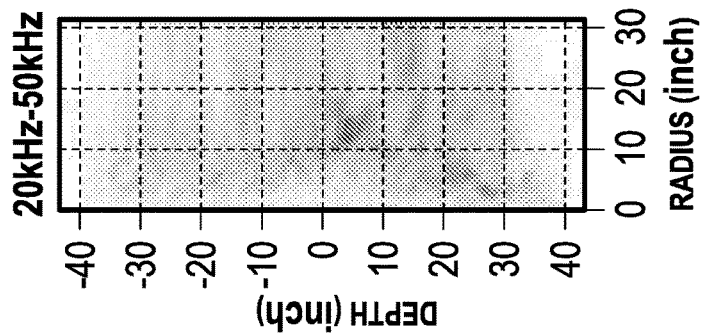
FIGS. 5B-5D are fused-signal maps computed based on acoustic signals acquired with the experimental setup of FIG. 5A for three different frequency bands, illustrating the resonant effect observed for an acoustic logging tool used inside double layers of tubing and casing.
Figure 5C:
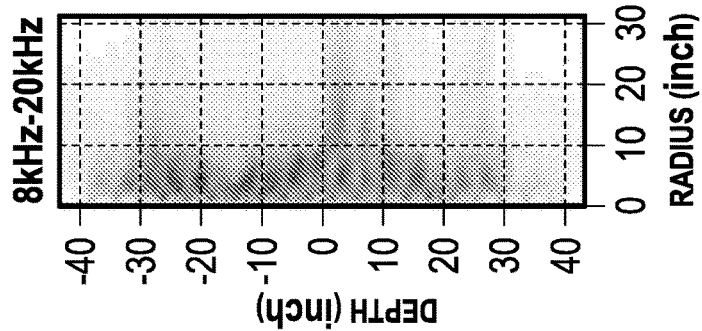
Figure 5B:
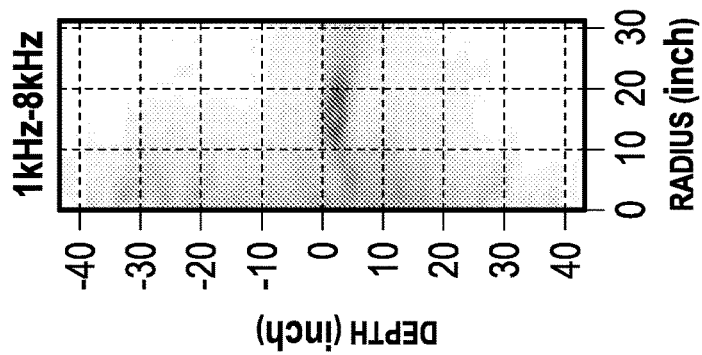
Figure 5A:
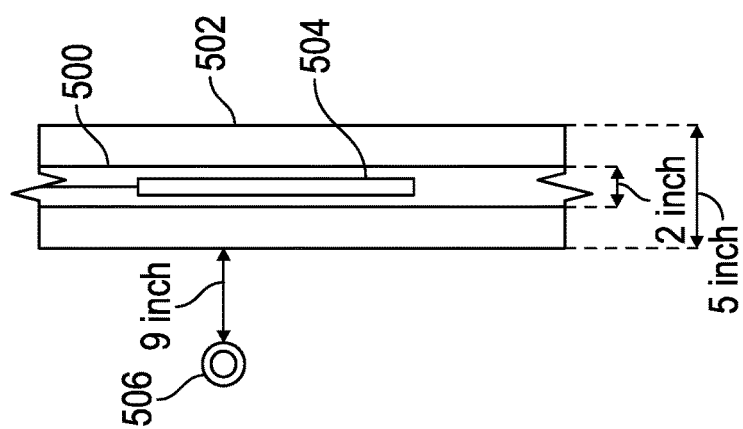
FIG. 5A is a schematic diagram of an experimental setup, including an acoustic source outside and an acoustic logging tool inside a double-layer borehole configuration, for testing the frequency dependence of beamforming results.

FIGS. 5A-5D illustrate the resonant effect observed for an acoustic logging tool used inside double layers of tubing and casing. Here, experimental data are derived from casing and tubing that were constructed to form a well configuration. FIG. 5A schematically depicts the experimental wellbore configuration, which includes two-inch-diameter steel tubing 500 inside five-inch diameter steel casing 502, the space in and surrounding the tubing 500 and casing 502 being filled with water. The tool 504 (which may comprise any or all of the embodiments of the tool 100 shown in FIG. 1, among others) is disposed inside the tubing 500 and measures acoustic signals generated across frequencies ranging from 1 kHz to 50 kHz by a source 506 located about nine inches away from the casing 502. FIGS. 5B-5D show the fused-signal maps computed from the measured signals within the frequency bands 1-8 kHz, 8-20 kHz, and 20-50 kHz, respectively. As can be seen, the acoustic source can be localized most clearly within the low-frequency band from 1-8 kHz and also, less clearly, within the high-frequency band from 20-50 kHz, but is indiscernible in the map computed for the intermediate frequency band from 8-20 kHz.

Figure 6A:
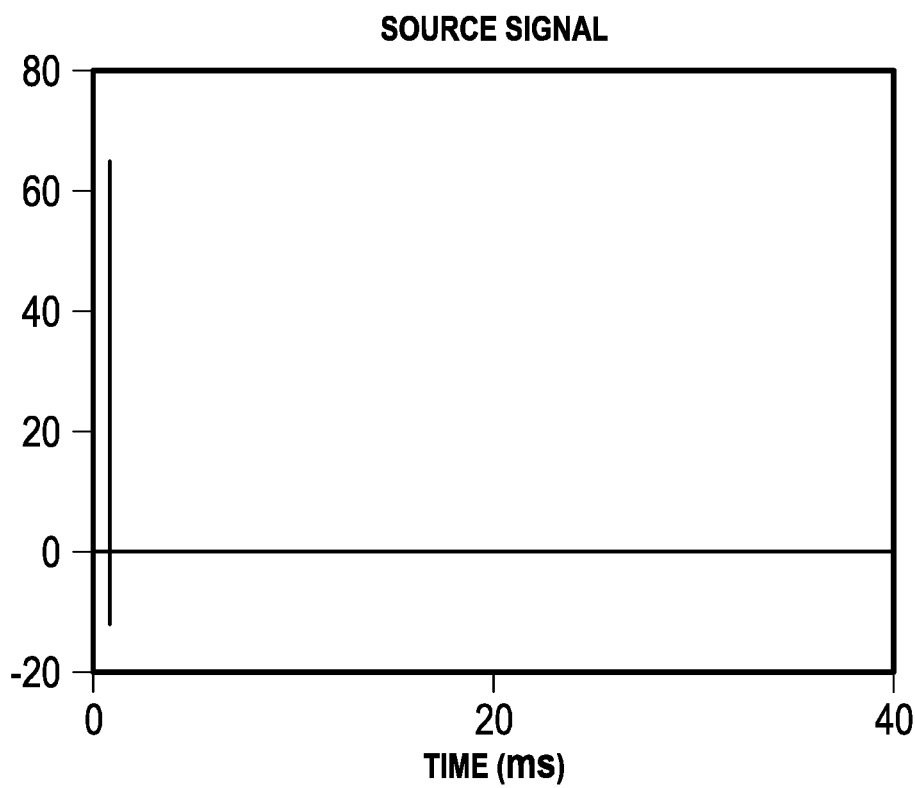
FIGS. 6A-6B are graphs of acoustic source signals and corresponding received acoustic signals in the time and frequency domains, as computationally simulated for the setup of FIG. 5A.
Figure 6B:
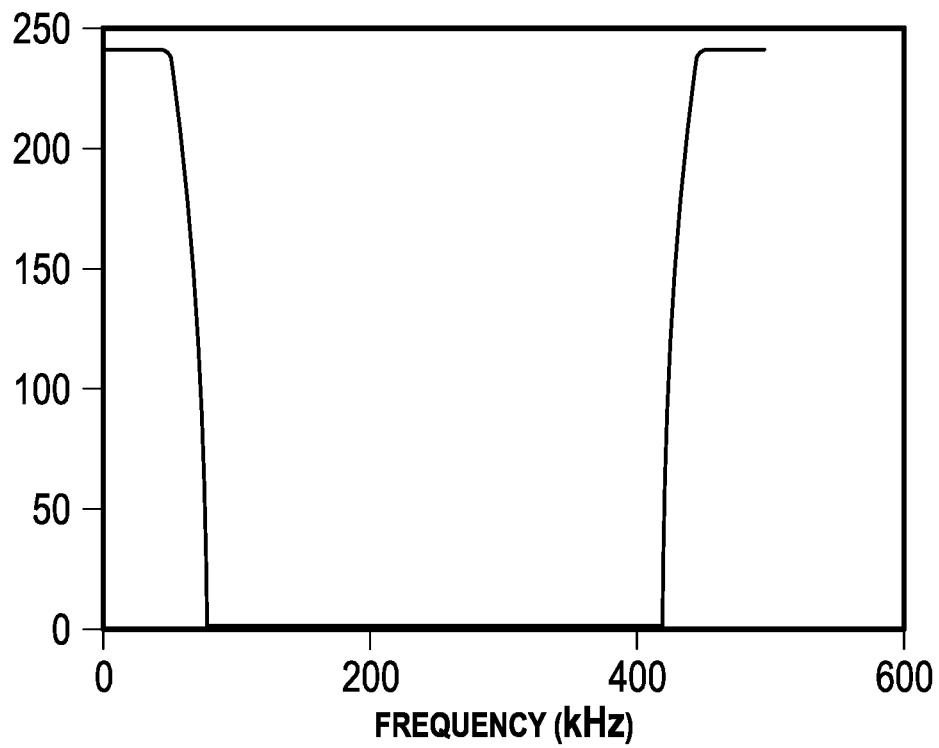
Figure 6C:
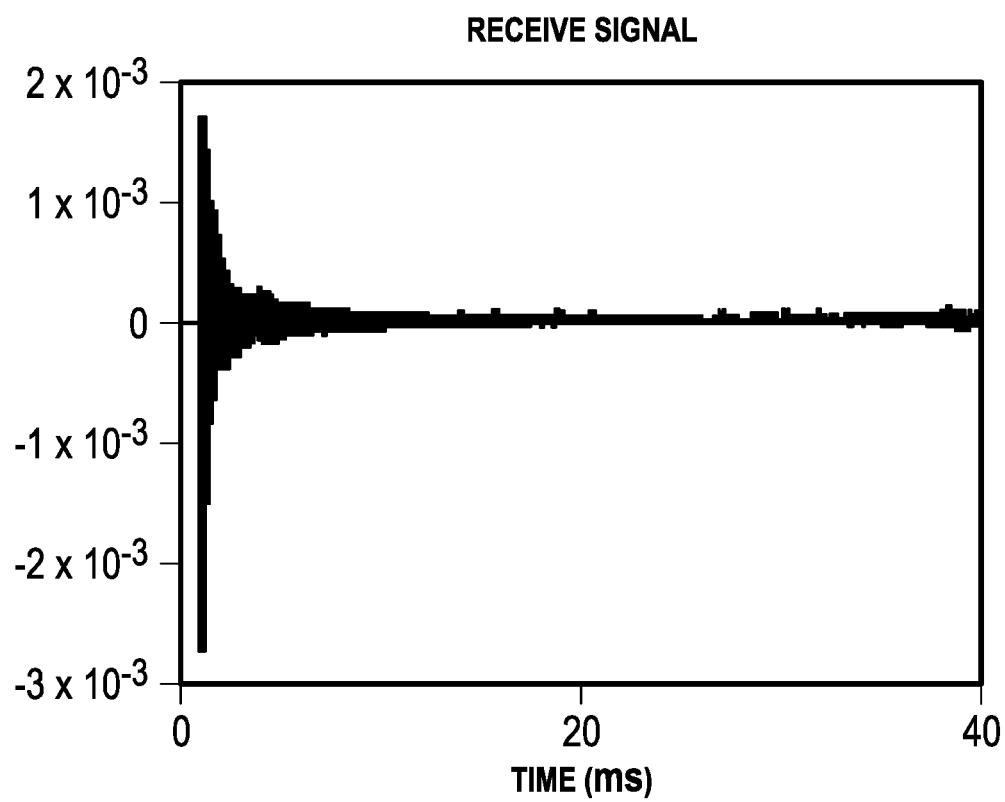
FIGS. 6C and 6D show the signal received at a sensor inside the tubing of FIG. 5A in the time domain and the frequency domain, respectively.
Figure 6D:
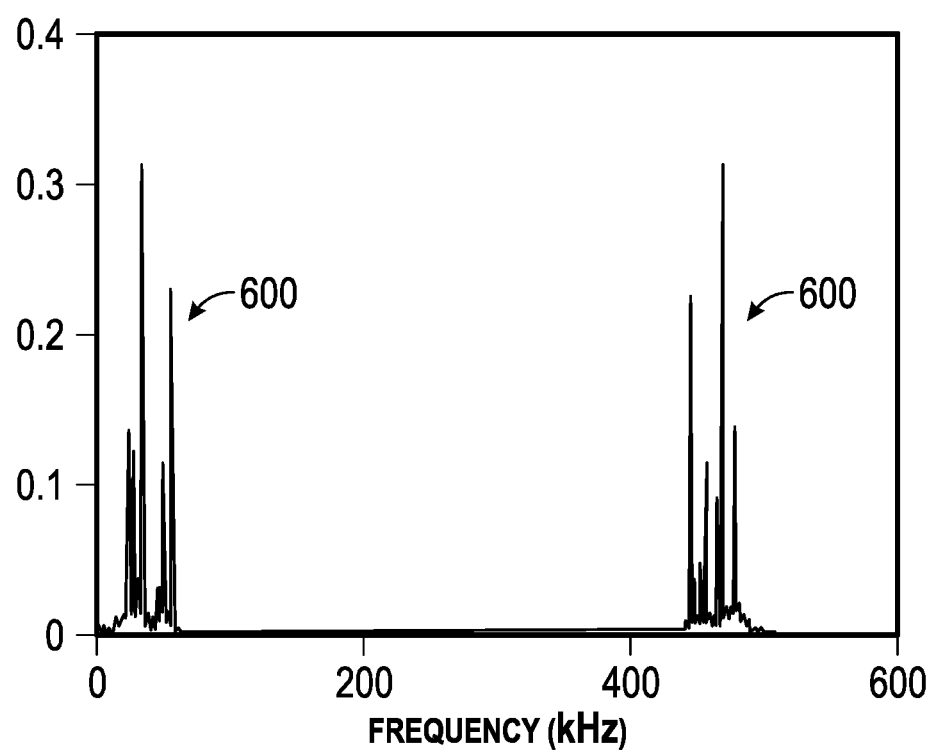
Figure 6E:
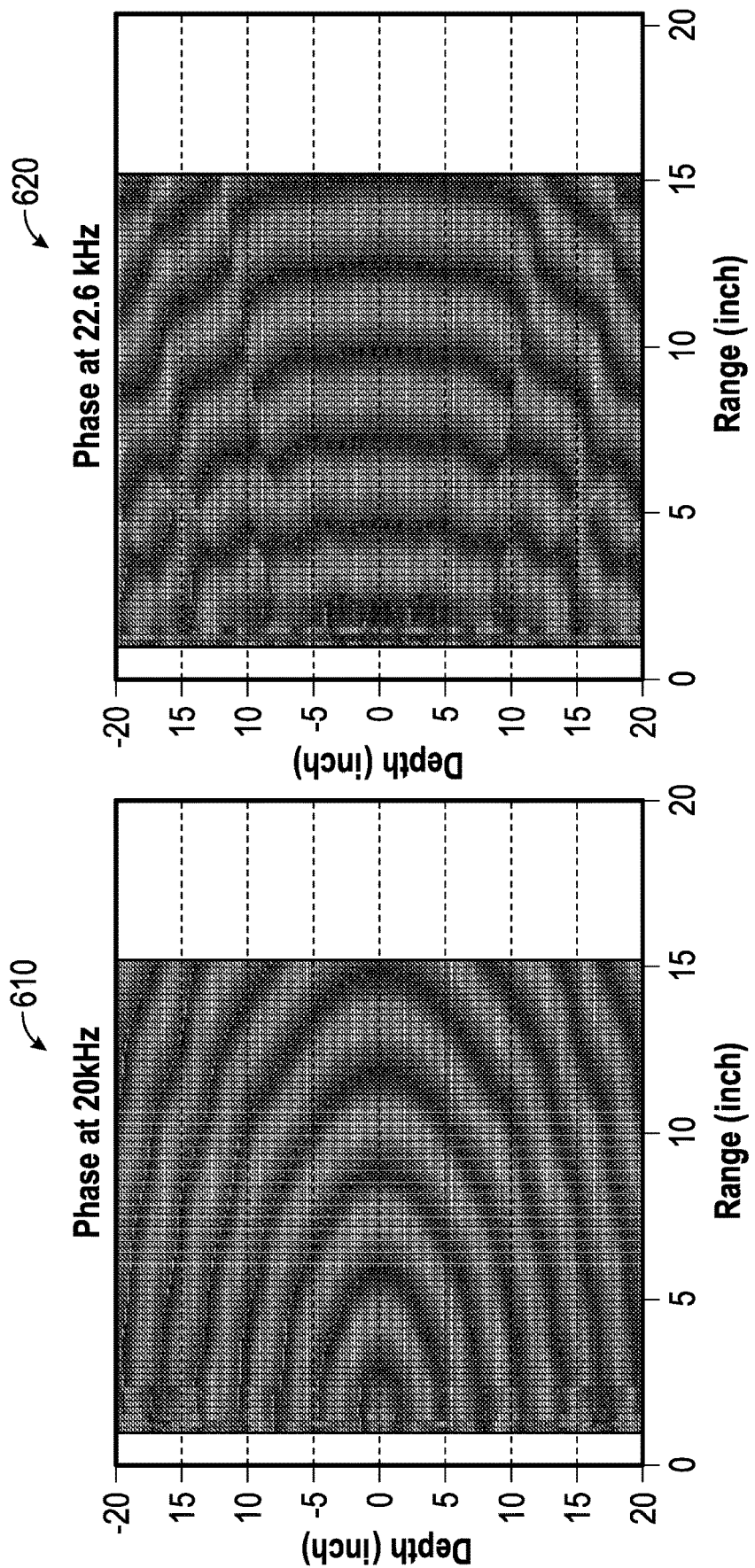
FIG. 6E illustrates the phase of an acoustic leak signal at different locations in space for a regular pattern at 20 kHz, and an irregular pattern at 22.6 kHz.

FIGS. 6A-6D show the results of a three-dimensional, full-wave transient electrodynamic field simulation performed for the configuration of FIG. 5A. For purposes of the simulation, the acoustic source was modeled by a broadband pulse having a flat spectrum ranging from 1 kHz to 50 kHz. The time-domain pulse is shown in the graph of FIG. 6A, and its spectrum is depicted in the graph of FIG. 6B. Here, the spectrum plot is generated using a Discrete Fourier Transform (DFT) with a sampling frequency Fs=500 kHz. As a result, the spectra are symmetric around Fs/2=250 kHz, with mirrored components from 450 kHz to 500 kHz (equivalent to 0-50 kHz). FIGS. 6C and 6D show the signal received at a sensor inside the tubing 500 of FIG. 5A in the time domain and the frequency domain, respectively. The spectrum of the received signal exhibits sharp spikes 600 at certain frequencies, whose number and spectral positions vary with the wellbore configuration. The peak of the received signal spectrum shifts with changes in the spacing between the tubing and casing, as the casing diameter changes. Applying beamforming around the frequencies of these spikes 600 confirms the performance degradation observed in the experimental data of FIGS. 5B-5D. FIG. 6E illustrates the phase of an acoustic leak signal at different locations in space for a regular pattern at 20 kHz, and an irregular pattern at 22.6 kHz. In this figure, the energy distribution of the regular pattern 610 (e.g., where the pattern 610 is close to circular) is clearly seen to be distorted, to form the irregular pattern 620, at the frequency 22.6 kHz, which is at the same frequency of one of the peaks in FIG. 6D.

FIGS. 5A-6E provide examples of the frequency dependence of the quality of beamforming results, illustrating the need for robust beamforming methods that adaptively select the most suitable frequencies, or boost them relative to other frequency by means of higher weighting. In various embodiments, the weights are set based on eigenvalues of the covariance matrices computed for the different frequency bins. Candidates for the weights include, for example and without limitation, the maximum (or "first") eigenvalue and eigenvalue rations such as the ratio of the maximum eigenvalue to the minimum eigenvalue (also known as the "condition number") or the ratio of the first eigenvalue to the second eigenvalue (also known as the "eigenratio"). The maximum eigenvalue reflects the energy distribution across the spectrum, whereas the eigenratio relates to the singularity of the covariance matrix, indicating non-random structure of the array signals. The condition number may comprise one type of eigenratio, which is the ratio between the maximum eigenvalue and the minimum eigenvalue. The condition number may be a useful indicator for a higher number of sources, whereas another type of eigenratio, which is the ratio between first and second largest eigenvalues, may indicate whether only one source is present.

The choice of the eigenvalue or combination (ratio or other) of eigenvalues used for the weighting may be made based on, e.g., the wellbore configuration (such as number and size of pipes, borehole fluids and formation properties) and types of anticipated leaks or other acoustic sources, as the eigenvalues or combinations thereof that provide the highest-quality combined fused-signal maps may differ between different circumstances. It has been observed, for instance, that the eigenratio is best suited to avoid frequencies at which the fused-signal map is severely distorted due to the casing effect.

Figure 8A:
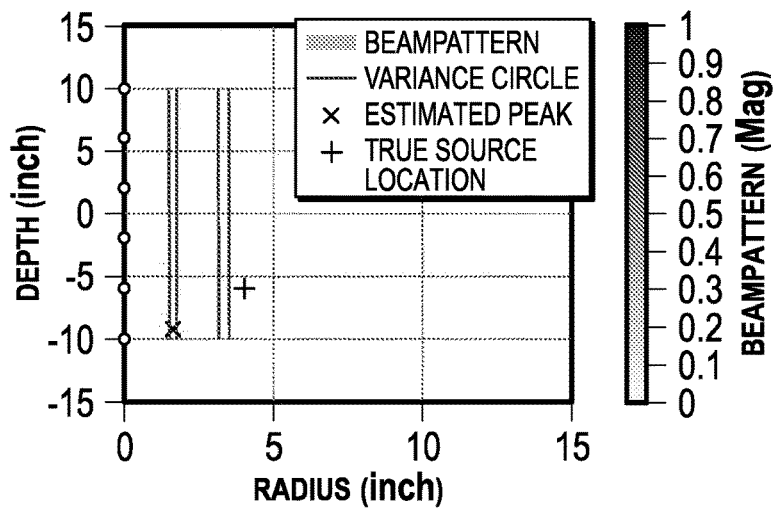
FIGS. 8A-8C are combined fused-signal maps derived from synthetic data, using equal weightings, weightings based on the maximum eigenvalues of the covariance matrices (as shown in FIG. 7A), and weightings based on the eigenratios of the covariance matrices (as shown in FIG. 7B), respectively, for the individual fused-signal maps for different frequencies, in accordance with various embodiments.
Figure 8B:
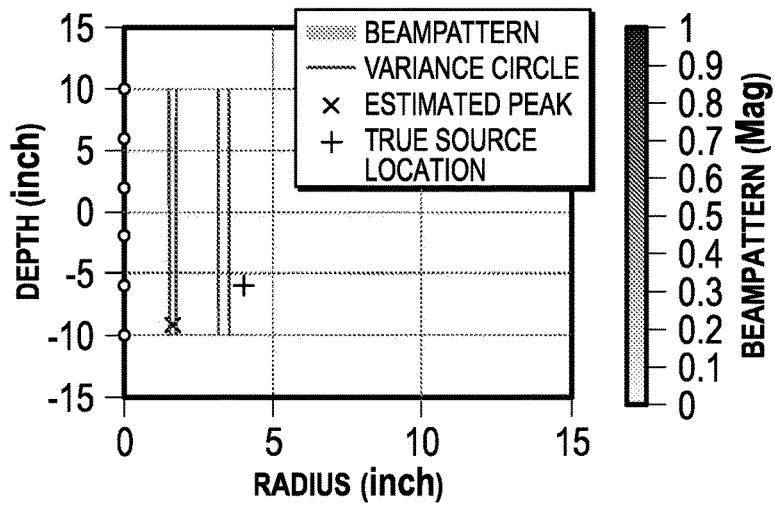
Figure 8C:
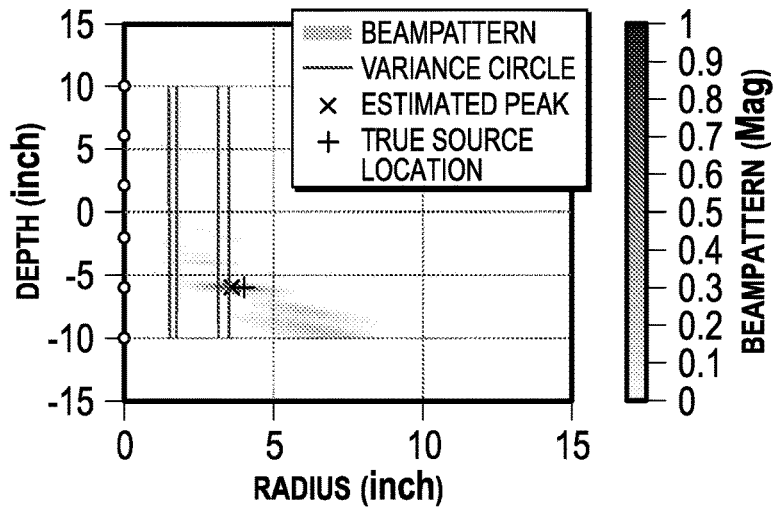
Figure 9A:
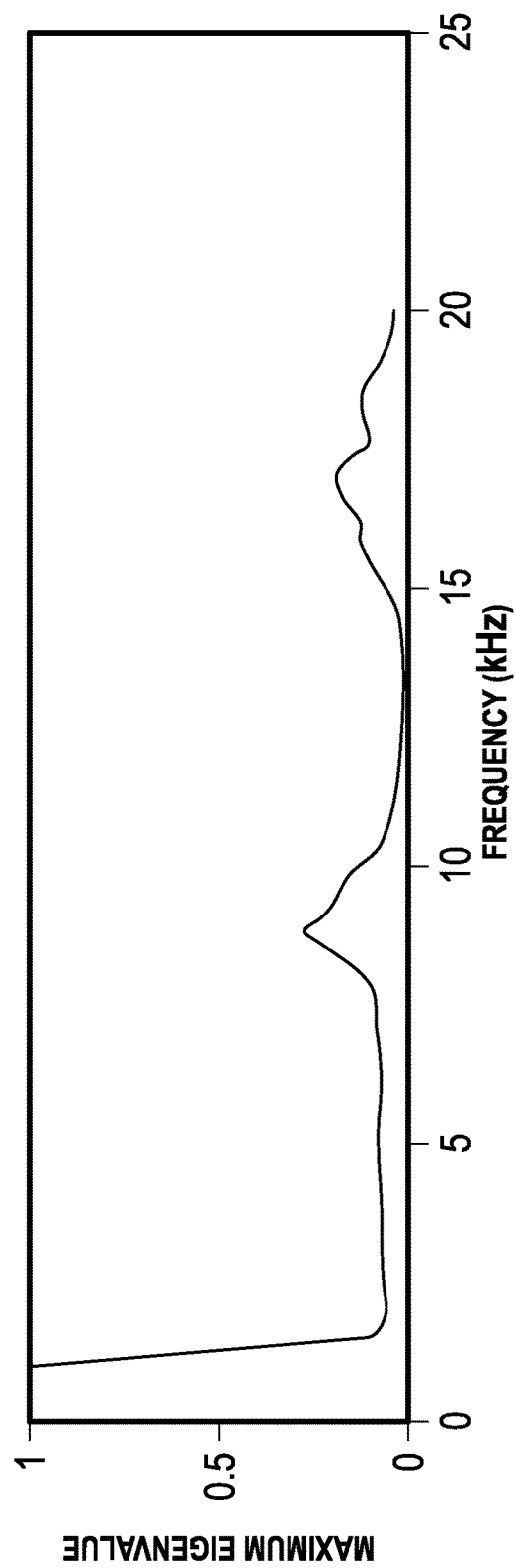
FIGS. 9A and 9B are graphs, derived from field data, of the maximum eigenvalue of the covariance matrix and the eigenratio of the covariance matrix, respectively, as a function of frequency, illustrating different weighting candidates in accordance with various embodiments.
Figure 9B:
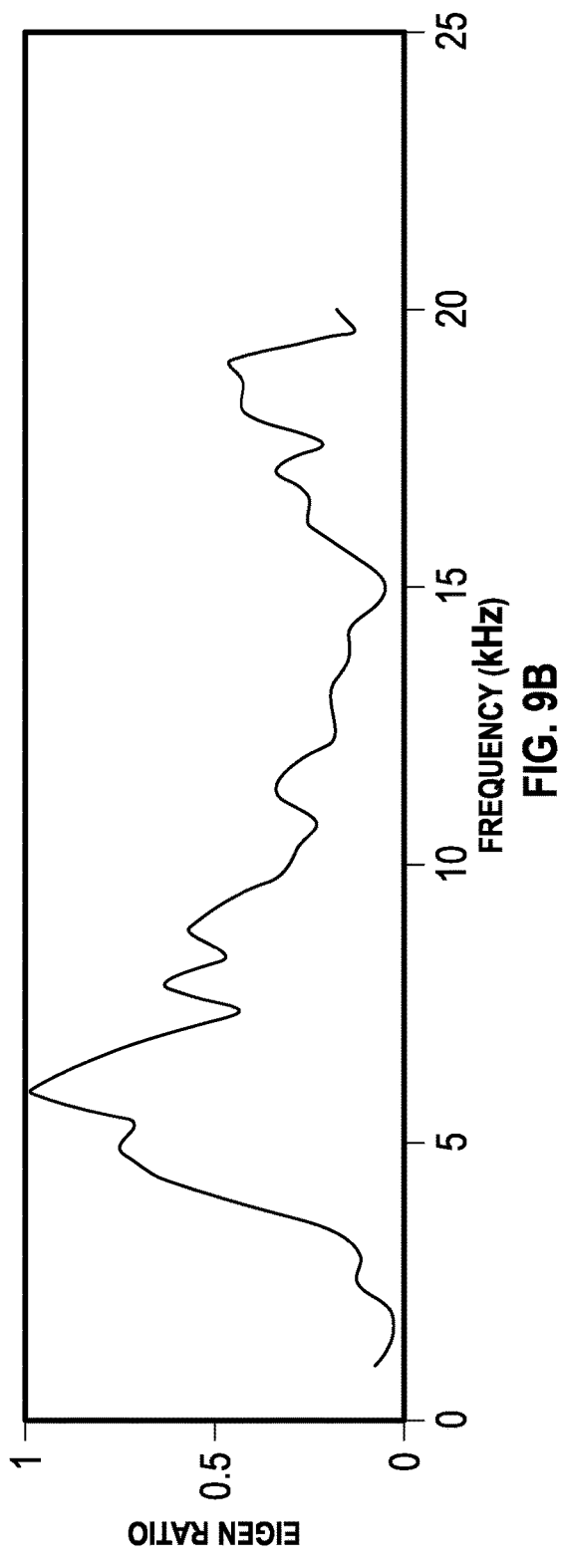
Figure 10B:
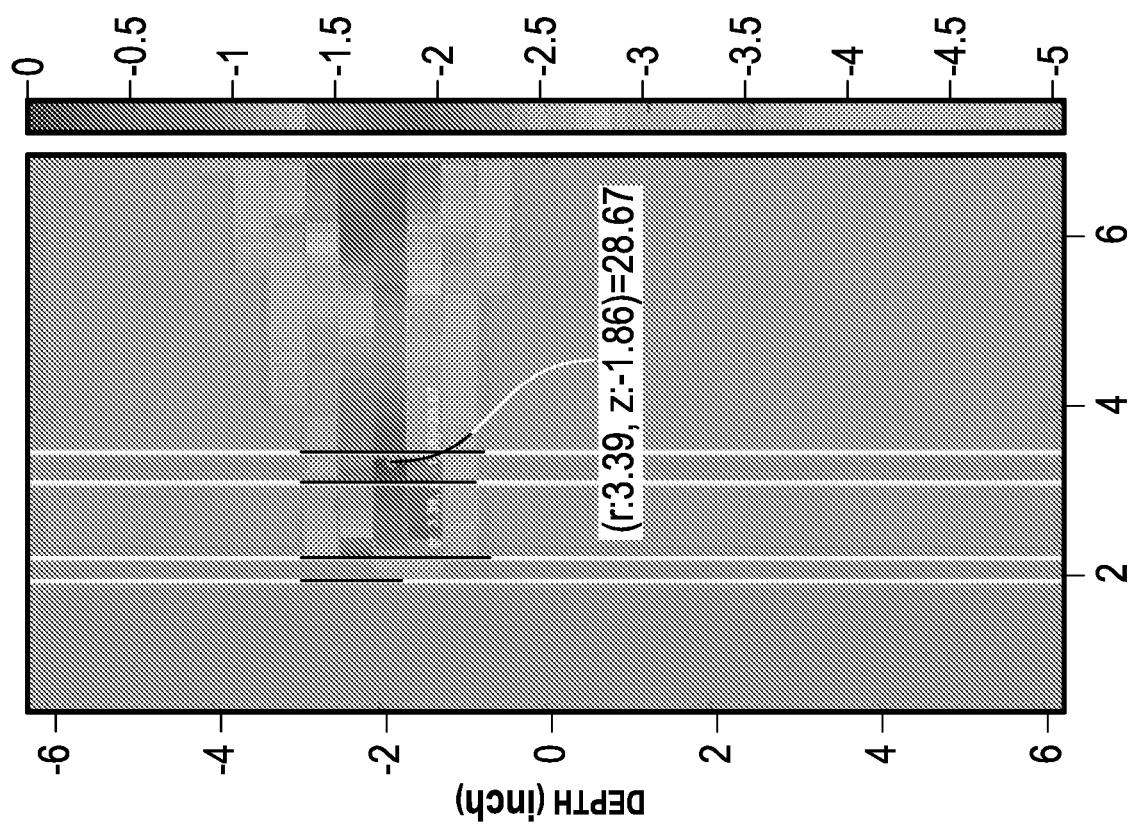
FIGS. 10A and 10B are combined fused-signal maps derived from field data, using the maximum eigenvalues (as shown in FIG. 9A) of the covariance matrices and the eigenratios of the covariance matrices (as shown in FIG. 9B), respectively, to weight the individual fused-signal maps for different frequencies, in accordance with various embodiments.
Figure 10A:
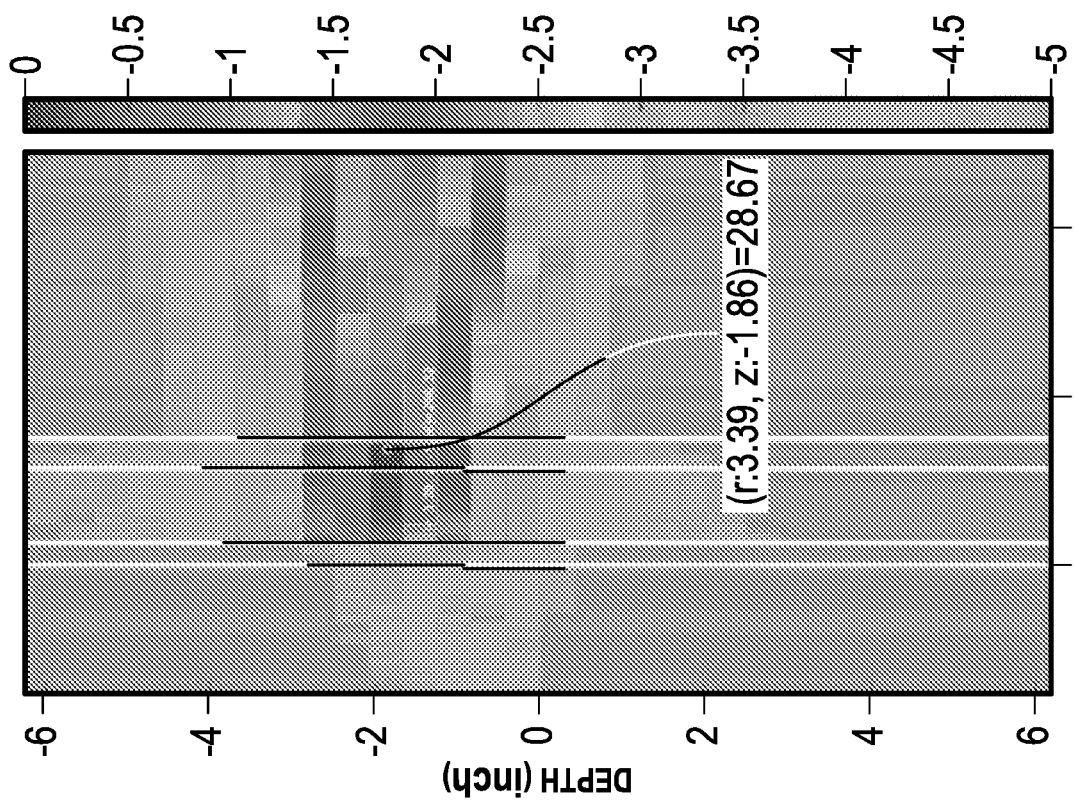

FIGS. 7A and 7B show two weight candidates—the maximum eigenvalue of the covariance matrix and the eigenratio of the covariance matrix, respectively—as a function of frequency, as derived from synthetic acoustic data. The results of applying these weights to the fused-signal maps obtained, by Capon beamforming, from the synthetic data for various frequency bins are shown in FIGS. 8A-8C. In addition to the acoustic-source location in depth and radial distance as determined from the combined fused-signal map, each of FIGS. 8A-8C also shows the true acoustic-source location for comparison. As can be seen, the eigenratio (FIG. 8C) is a good weight candidate for improving the beamforming quality and, thus, the accuracy with which the acoustic source is localized, as it results in an estimated acoustic-source location that is much closer to the true source location than the estimated locations without weighting (or, put differently, with uniform weighting across frequencies) (FIG. 8A) or with maximum-eigenvalue-based weighting (FIG. 8B). This observation is confirmed by the field trial data provided in FIGS. 9A-10B. FIGS. 9A and 9B show the maximum eigenvalue of the covariance matrix and the eigenratio of the covariance matrix, respectively, as computed from measured acoustic signals for various frequencies. FIGS. 10A and 10B illustrate combined fused-signal maps derived from the field data, using the maximum eigenvalues (as shown in FIG. 9A) and the eigenratios (as shown in FIG. 9B), respectively, as weights. As can be seen by comparison, eigenratio-based weighting results in much more focused energy distribution (suggestive of better beamforming quality) than maximum-eigenvalue-based weighting. In this experiment, the true acoustic-source location can be determined by verifying the results with the structure of the well. For example, the true acoustic source location may be the location of a packer, leaking due to corrosion.

Figure 11:
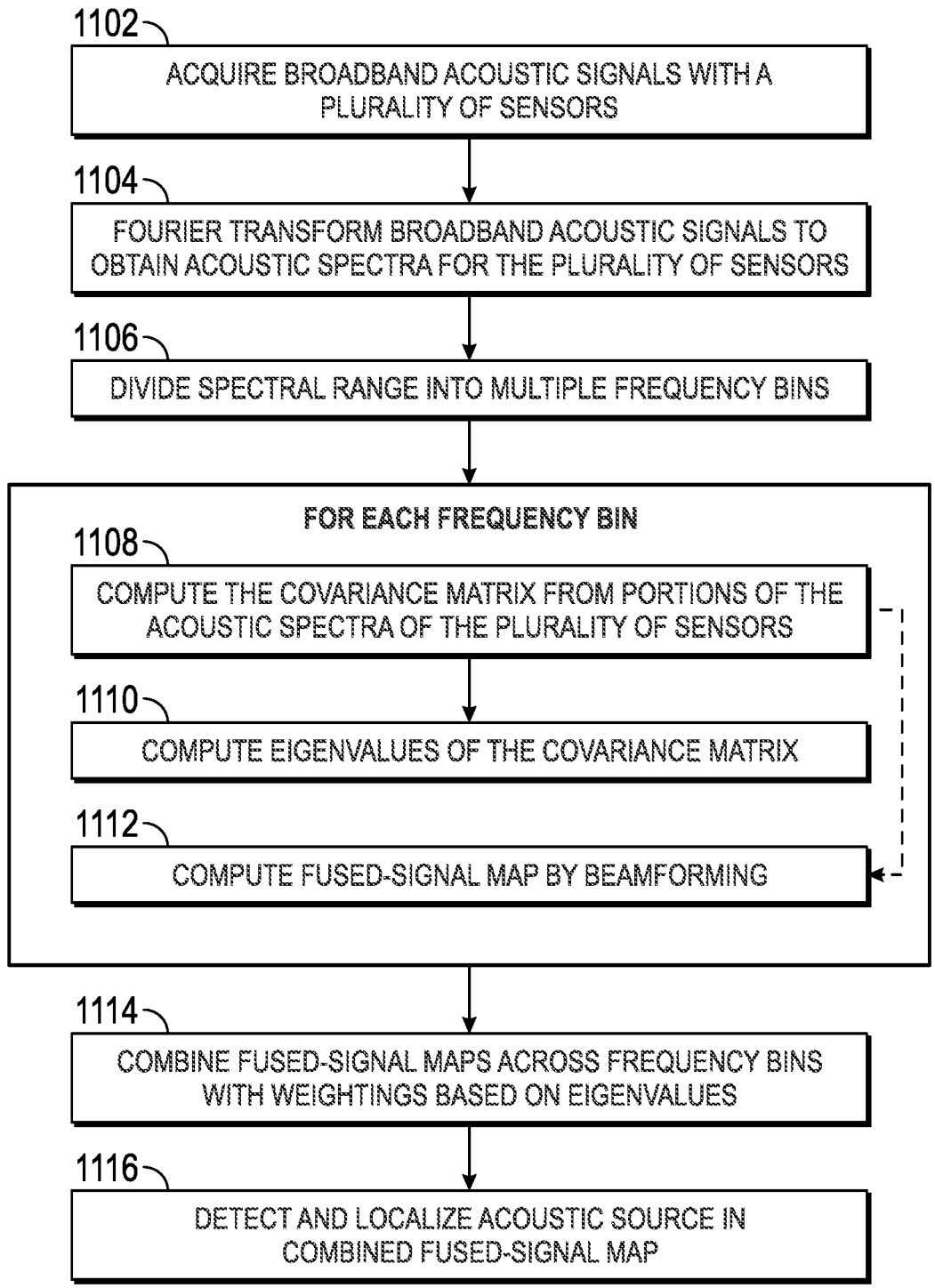
FIG. 11 is a flow chart of a broadband acoustic beamforming method in accordance with various embodiments.

FIG. 11 is a flow chart illustrating a broadband acoustic beamforming method 1100 in accordance with various embodiments. The method 1100 involves acquiring broadband acoustic signals with a plurality of sensors (act 1102). The sensors may, for instance, form an acoustic sensor array of an acoustic logging tool 100 disposed in a wellbore, e.g., for the purpose of detecting leaks in the well barriers. The broadband acoustic signals are converted, by Fourier transform (e.g., if implemented on a computer, by fast Fourier transform or some other discrete Fourier transform algorithm) into acoustic spectra for the plurality of sensors (act 1104), and the spectral range covered by the spectra is divided into multiple frequency bins $f_n$ (n=1 ... N) (act 1106). For the purpose of statistical stability, the total measurement interval associated with the acquired time-domain acoustic signals is, in certain embodiments, divided into a plurality of disjoint sub-intervals, and window Fourier transform is performed on each of the sub-intervals. For K sub-intervals (k=1 ... K), this will result, for each frequency bin $f_n$, in a set of K signal vectors $\{X_1(f_n), \ldots, X_k(f_n), \ldots X_K(f_n)\}$.

For each frequency bin $f_n$, the respective portions of the spectra for the plurality of sensors are processed together to compute a covariance matrix for the frequency bin (act 1108), summing over the K disjoint intervals if applicable:

$$\hat{R}(f_n) = \frac{1}{K}\sum_{k=1}^{K} X_k(f_n)X_k^H(f_n).$$

The eigenvalues of the covariance matrix $\hat{R}(f_n)$ of each bin can then be computed (act 1110) using methods well-known to those of ordinary skill in the art such as, e.g., singular value decomposition. Furthermore, for each frequency bin $f_n$, a fused-signal map is computed by a suitable beamforming (or other array-signal processing technique (1112)). For example, in some embodiments, Capon beamforming (as described in detail above) is used to compute a fused-signal map based in part on the covariance matrix computed in act 1108. Other beamforming techniques that utilize the covariance matrix include, e.g., MUSIC beamforming, minimum-norm beamforming, and maximum likelihood beamforming; some of these methods differ from others in the way in which the covariance matrix is computed). Note that, while it may be efficient to employ a covariance-matrix-based beamforming technique to compute the fused-signal map, beamforming methods that do not involve the covariance matrix (e.g., compressive beamforming or delay and sum beamforming) may in principle also be used.

In act 1114, the fused-signal maps computed for the individual frequency bins are combined into a single fused-signal map by weighted averaging, using selected eigenvalues or eigenvalue ratios or combinations (e.g., in some embodiments, the eigenratios, i.e., ratios of first and second eigenvalues) of the covariance matrices for respective frequency bins as weights. From the combined fused-signal map, the existence and location of any acoustic source(s) can then be inferred (act 1116) by identifying one or more local maxima, optionally comparing respective fused-signal amplitude(s) at the maximum or maxima against a predetermined threshold, and ascertaining the depth(s) and radial distance(s) of the maximum/maxima within the fused-signal map.

Figure 12:
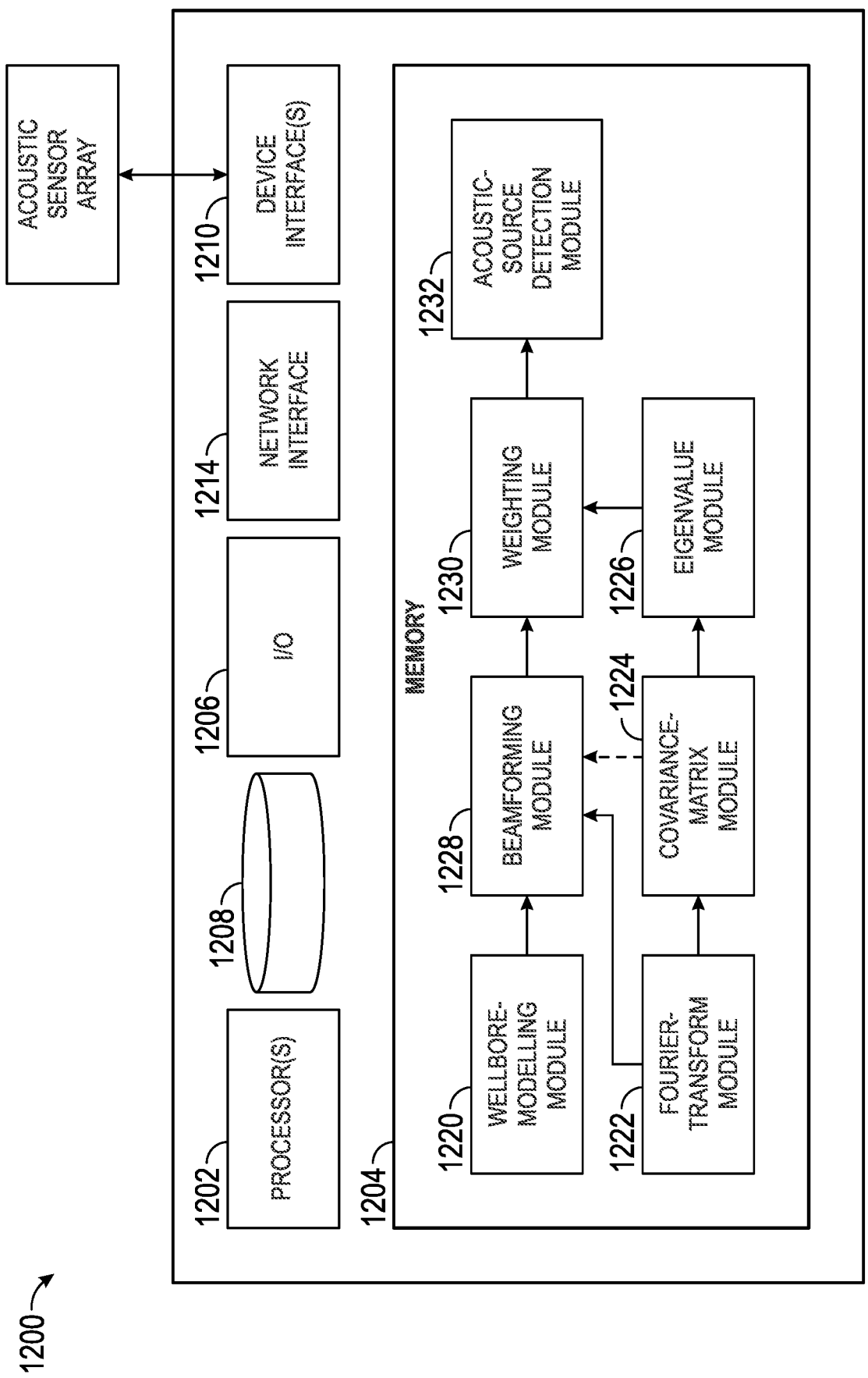
FIG. 12 is a block diagram of an example data-processing facility for implementing the computational functionality of the method of FIG. 11, in accordance with various embodiments.

FIG. 12 is a block diagram of an example data-processing facility 1200 in the form of a suitably programmed general-purpose computer (e.g., any one or more elements of which may be implemented by the control and processing circuitry 116, the surface data-processing system 118, or a combination of the two) for implementing the computational functionality of the method of FIG. 11, in accordance with various embodiments. Various elements of the example data-processing facility 1200 will now be described.

The data-processing facility 1200 includes one or more processors 1202 (e.g., a conventional central processing unit (CPU), graphical processing unit, or other) configured to execute software programs stored in memory 1204 (which may be, e.g., random-access memory (RAM), read-only memory (ROM), flash memory, etc.). Further, the data-processing facility 1200 may include user input/output devices 1206 (e.g., a screen, keyboard, mouse, etc.), permanent-data-storage devices 1208 (including, e.g., solid-state, optical, and/or magnetic machine-readable media such as hard disks, CD-ROMs, DVD-ROMs, etc.), device interfaces 1210 for communicating directly or indirectly with the acoustic sensor array (e.g., array 112), a network interface 1214 that facilitates communication with other computer systems and/or data repositories, and a system bus (not shown) through which the other components communicate. While shown as a single unit, the data-processing facility 1200 may also be distributed over multiple machines connected to each other via a wired or wireless network such as a local network or the Internet.

The software programs stored in the memory 1204 (and/or in permanent-data-storage devices 1208) include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a wellbore-modelling module 1220 for characterizing the wellbore and its surroundings and adjusting the free-space steering vector based thereon; a Fourier transform module 1222 configured to convert time-domain signals acquired by the acoustic sensors into spectra (e.g., implementing a fast Fourier transform algorithm); a covariance matrix module 1224 configured to compute covariance matrices for multiple respective frequency bins from the spectra; an eigenvalue module 1226 configured to compute the eigenvalues of the covariance matrices (e.g., implementing a singular-value-decomposition algorithm); a beamforming (or, more broadly, array-signal-processing) module 1228 configured to fuse the Fourier-transformed acoustic signals from multiple sensors, based at least in part on the wellbore model, to compute a fused-signal parameter map for a range of depths and radial distances (using the covariance matrices in some embodiments); a weighting module 1230 configured to combine the fused-signal maps across frequency bins in a weighted manner, using the eigenvalues as weighting factors; and an acoustic-source detection module 1232 configured to identify one or more local maxima indicative of acoustic sources in the fused-signal parameter map and determine their locations.

Of course, the depicted organization into modules is merely one non-limiting example of ways in which instructions that implement the disclosed functionality can be grouped. Further, the various computational modules depicted in FIG. 12 need not all be part of the same software program or even stored on the same machine. Rather, certain groups of modules can operate independently of the others and provide data output that can be stored and subsequently provided as input to other modules. Further, as will be readily appreciated by those of ordinary skill in the art, software programs implementing the methods described herein (e.g., organized into functional modules as depicted in FIG. 12) may be stored, separately from any data-processing facility, in one or more tangible, non-volatile machine-readable media (such as, without limitation, solid-state, optical, or magnetic storage media), from which they may be loaded into (volatile) system memory of a data-processing facility for execution. In addition, software programs may be communicated on suitable carrier media (tangible or non-tangible), such as signals transmitted over a network.

In general, the data-processing facility carrying out the computational functionality described herein (optionally as organized into various functional modules) can be implemented with any suitable combination of hardware, firmware, and/or software. For example, the data-processing facility may be permanently configured (e.g., with hardwired circuitry) or temporarily configured (e.g., programmed), or both in part, to implement the described functionality. A tangible entity configured, whether permanently and/or temporarily, to operate in a certain manner or to perform certain operations described herein, is herein termed a "hardware-implemented module" or "hardware module," and a hardware module using one or more processors is termed a "processor-implemented module." Hardware modules may include, for example, dedicated circuitry or logic that is permanently configured to perform certain operations, such as a field-programmable gate array (FPGA), application-specific integrated circuit (ASIC), or other special-purpose processor. A hardware module may also include programmable logic or circuitry, such as a general-purpose processor, that is temporarily configured by software to perform certain operations. Considering example embodiments in which hardware modules are temporarily configured, the hardware modules collectively implementing the described functionality need not all co-exist at the same time, but may be configured or instantiated at different times. For example, where a hardware module comprises a general-purpose processor configured by software to implement a special-purpose module, the general-purpose processor may be configured for respectively different special-purpose modules at different times.

The following numbered examples are illustrative embodiments:

1. A method comprising: acquiring broadband acoustic signals with a plurality of sensors disposed within a wellbore; Fourier-transforming the broadband acoustic signals to obtain respective acoustic spectra for the plurality of sensors, the acoustic spectra covering a frequency range; for each of a plurality of frequency bins within the frequency range, computing a covariance matrix from the acoustic spectra for the plurality of sensors, computing eigenvalues of the covariance matrix, and using an array signal processing technique to compute a fused-signal map; combining the fused-signal maps computed for the plurality of frequency bins, the maps weighted based on the eigenvalues of the corresponding covariance matrices; and determining a depth and radial distance from the wellbore of an acoustic source based on the combined fused-signal maps.

2. The method of example 1, wherein the fused-signal maps are computed based at least in part on the respective covariance matrices.

3. The method of example 2, wherein the array signal processing technique comprises at least one of Capon beamforming, MUSIC beamforming, minimum-norm beamforming, maximum likelihood beamforming.

4. The method of any one of examples 1-3, wherein the fused-signal maps computed for the plurality of frequency bins are weighted by ratios of the corresponding eigenvalues.

5. The method of example 3, wherein the ratios of eigenvalues are condition numbers.

6. The method of example 3, wherein the ratios of eigenvalues comprise a ratio of a first largest one of the corresponding eigenvalues and a second largest one of the corresponding eigenvalues.

7. The method of example 3, wherein the fused-signal maps computed for the plurality of frequency bins are weighted by the corresponding maximum eigenvalues.

8. The method of any one of examples 1-7, wherein the depth and radial distance of the acoustic source are determined from a maximum of the fused-signal map.

9. The method of any one of examples 1-8, further comprising dividing a total measurement interval associated with the acquired acoustic signals into a plurality of disjoint sub-intervals, wherein Fourier-transforming the acquired acoustic signals comprises applying a window Fourier transform to signal portions within each of the sub-intervals and computing the covariance matrices comprises summing over the sub-intervals.

10. A system, comprising: an acoustic logging tool comprising a plurality of acoustic sensors, configured to acquire broadband acoustic signals; and a data-processing facility for processing the broadband acoustic signals acquired by the acoustic sensors. The processing facility is configured to: Fourier transform the broadband acoustic signals to obtain respective acoustic spectra for the plurality of sensors, the acoustic spectra covering a frequency range; for each of a plurality of frequency bins within the frequency range, compute a covariance matrix from the acoustic spectra for the plurality of sensors, compute eigenvalues of the covariance matrix, and use an array signal processing technique to compute a fused-signal map; combine the fused-signal maps computed for the plurality of frequency bins, weighting the maps based on the eigenvalues of the corresponding covariance matrices; and determine a depth and radial distance from the wellbore of an acoustic source based on the combined fused-signal maps.

11. The system of example 10, wherein the data-processing facility is configured to compute the fused-signal maps based at least in part on the respective covariance matrices.

12. The system of example 11, wherein the array signal processing technique comprises at least one of Capon beamforming, MUSIC beamforming, minimum-norm beamforming, maximum likelihood beamforming.

13. The system of any one of examples 10-12, wherein the data-processing facility is configured to weight the fused-signal maps computed for the plurality of frequency bins by ratios of the corresponding eigenvalues.

14. The system of example 13, wherein the ratios of eigenvalues comprise a ratio of a first largest one of the corresponding eigenvalues and a second largest one of the corresponding eigenvalues.

15. The system of any one of examples 10-14, wherein the data-processing facility is configured to determine the depth and radial distance of the acoustic source from a maximum of the fused-signal map.

16. A tangible machine-readable medium storing processor-executable instructions for processing broadband acoustic signals acquired by a plurality of acoustic sensors, the instructions configured to control the operation of one or more processors to: Fourier transform the broadband acoustic signals to obtain respective acoustic spectra for the plurality of sensors, the acoustic spectra covering a frequency range; for each of a plurality of frequency bins within the frequency range, compute a covariance matrix from the acoustic spectra for the plurality of sensors, compute eigenvalues of the covariance matrix, and use an array signal processing technique to compute a fused-signal map; combine the fused-signal maps computed for the plurality of frequency bins, the maps weighted based on the eigenvalues of the corresponding covariance matrices; and determine a depth and radial distance from the wellbore of an acoustic source based on the combined fused-signal maps.

17. The machine-readable medium of example 16, wherein the instructions are configured to control the operation of the one or more processors to compute the fused-signal maps based at least in part on the respective covariance matrices.

18. The machine-readable medium of example 16 or example 17, wherein the instructions are configured to control the operation of the one or more processors to weight the fused-signal maps computed for the plurality of frequency bins by ratios of the corresponding eigenvalues.

19. The machine-readable medium of example 18, wherein the ratios of eigenvalues comprise a ratio of a first largest one of the corresponding eigenvalues and a second largest one of the corresponding eigenvalues.

20. The machine-readable medium of any one of examples 16-29, wherein the instructions are configured to control the operation of the one or more processors to determine the depth and radial distance of the acoustic source from a maximum of the fused-signal map.

Many variations may be made in the systems, tools, and methods described and illustrated herein without departing from the scope of the inventive subject matter. Accordingly, the scope of the inventive subject matter is to be determined by the scope of the following claims and all additional claims supported by the present disclosure, and all equivalents of such claims.

What is claimed is:

1. A method, comprising:
   acquiring broadband acoustic signals with a plurality of sensors disposed within a wellbore;
   Fourier-transforming the broadband acoustic signals to obtain respective acoustic spectra for the plurality of sensors, the acoustic spectra covering a frequency range;
   for each of a plurality of frequency bins within the frequency range,
      computing a covariance matrix from the acoustic spectra for the plurality of sensors,
      computing eigenvalues of the covariance matrix, and
      using an array signal processing technique to compute a fused-signal map;
   combining the fused-signal maps computed for the plurality of frequency bins, the maps weighted based on the eigenvalues of the corresponding covariance matrices; and
   determining a depth and radial distance from the wellbore of an acoustic source based on the combined fused-signal maps.

2. The method of claim 1, wherein the fused-signal maps are computed based at least in part on the respective covariance matrices.

3. The method of claim 1, wherein the fused-signal maps computed for the plurality of frequency bins are weighted by ratios of the corresponding eigenvalues.

4. The method of claim 3, wherein the ratios of eigenvalues are condition numbers.

5. The method of claim 3, wherein the ratios of eigenvalues comprise a ratio of a first largest one of the corresponding eigenvalues and a second largest one of the corresponding eigenvalues.

6. The method of claim 1, wherein the fused-signal maps computed for the plurality of frequency bins are weighted by the corresponding maximum eigenvalues.

7. The method of claim 1, wherein the depth and radial distance of the acoustic source are determined from a maximum of the fused-signal map.

8. The method of claim 1, wherein the array signal processing technique comprises at least one of Capon beamforming, MUSIC beamforming, minimum-norm beamforming, maximum likelihood beamforming.

9. The method of claim 1, further comprising dividing a total measurement interval associated with the acquired acoustic signals into a plurality of disjoint sub-intervals, wherein Fourier-transforming the acquired acoustic signals comprises applying a window Fourier transform to signal portions within each of the sub-intervals and computing the covariance matrices comprises summing over the sub-intervals.

10. A system, comprising:
    an acoustic logging tool comprising a plurality of acoustic sensors configured to acquire broadband acoustic signals; and
    a data-processing facility for processing the broadband acoustic signals acquired by the acoustic sensors, the processing facility configured to:
       Fourier transform the broadband acoustic signals to obtain respective acoustic spectra for the plurality of sensors, the acoustic spectra covering a frequency range;
       for each of a plurality of frequency bins within the frequency range,
          compute a covariance matrix from the acoustic spectra for the plurality of sensors,
          compute eigenvalues of the covariance matrix, and
          use an array signal processing technique to compute a fused-signal map;
       combine the fused-signal maps computed for the plurality of frequency bins, weighting the maps based on the eigenvalues of the corresponding covariance matrices; and
       determine a depth and radial distance from the wellbore of an acoustic source based on the combined fused-signal maps.

11. The system of claim 10, wherein the data-processing facility is configured to compute the fused-signal maps based at least in part on the respective covariance matrices.

12. The system of claim 10, wherein the data-processing facility is configured to weight the fused-signal maps computed for the plurality of frequency bins by ratios of the corresponding eigenvalues.

13. The system of claim 12, wherein the ratios of eigenvalues comprise a ratio of a first largest one of the corresponding eigenvalues and a second largest one of the corresponding eigenvalues.

14. The system of claim 10, wherein the data-processing facility is configured to determine the depth and radial distance of the acoustic source from a maximum of the fused-signal map.

15. The system of claim 10, wherein the array signal processing technique comprises at least one of Capon beamforming, MUSIC beamforming, minimum-norm beamforming, maximum likelihood beamforming.

16. A tangible machine-readable medium storing processor-executable instructions for processing broadband acoustic signals acquired by a plurality of acoustic sensors, the instructions configured to control the operation of one or more processors to:
    Fourier transform the broadband acoustic signals to obtain respective acoustic spectra for the plurality of sensors, the acoustic spectra covering a frequency range;
    for each of a plurality of frequency bins within the frequency range,
       compute a covariance matrix from the acoustic spectra for the plurality of sensors,
       compute eigenvalues of the covariance matrix, and
       use an array signal processing technique to compute a fused-signal map;
    combine the fused-signal maps computed for the plurality of frequency bins, the maps weighted based on the eigenvalues of the corresponding covariance matrices; and
    determine a depth and radial distance from the wellbore of an acoustic source based on the combined fused-signal maps.

17. The machine-readable medium of claim 16, wherein the instructions are configured to control the operation of the one or more processors to compute the fused-signal maps based at least in part on the respective covariance matrices.

18. The machine-readable medium of claim 16, wherein the instructions are configured to control the operation of the one or more processors to weight the fused-signal maps computed for the plurality of frequency bins by ratios of the corresponding eigenvalues.

19. The machine-readable medium of claim 18, wherein the ratios of eigenvalues comprise a ratio of a first largest one of the corresponding eigenvalues and a second largest one of the corresponding eigenvalues.

20. The machine-readable medium of claim 16, wherein the instructions are configured to control the operation of the one or more processors to determine the depth and radial distance of the acoustic source from a maximum of the fused-signal map.

* * * * *